(12) United States Patent
Liu et al.

(10) Patent No.: US 11,308,807 B2
(45) Date of Patent: Apr. 19, 2022

(54) ROADSIDE DEVICE, COMMUNICATION SYSTEM, AND DANGER DETECTION METHOD

(71) Applicant: PANASONIC CORPORATION, Osaka (JP)

(72) Inventors: Weijie Liu, Tokyo (JP); Tsuyoshi Ueno, Kanagawa (JP)

(73) Assignee: PANASONIC CORPORATION, Osaka (JP)

( * ) Notice: Subject to any disclaimer, the term of this patent is extended or adjusted under 35 U.S.C. 154(b) by 48 days.

(21) Appl. No.: 16/753,566

(22) PCT Filed: Aug. 6, 2018

(86) PCT No.: PCT/JP2018/029392
§ 371 (c)(1),
(2) Date: Apr. 3, 2020

(87) PCT Pub. No.: WO2019/069554
PCT Pub. Date: Apr. 11, 2019

(65) Prior Publication Data
US 2020/0349843 A1    Nov. 5, 2020

(30) Foreign Application Priority Data

Oct. 4, 2017   (JP) .............................. JP2017-194135

(51) Int. Cl.
G08G 1/16     (2006.01)
G08G 1/01     (2006.01)
H04W 4/02     (2018.01)

(52) U.S. Cl.
CPC .......... *G08G 1/164* (2013.01); *G08G 1/0116* (2013.01); *G08G 1/166* (2013.01); *H04W 4/025* (2013.01)

(58) Field of Classification Search
CPC ....... B60R 21/00; G01S 13/931; G01S 17/42; G01S 17/931; G01S 2013/9316;
(Continued)

(56) References Cited

U.S. PATENT DOCUMENTS 5,767,803 A      6/1998   Yamada
2015/0112511 A1*  4/2015  Ando ................ G08G 1/09675
                                                    701/1
(Continued)

FOREIGN PATENT DOCUMENTS

JP        05-30996 U      4/1993
JP        2004-157847     6/2004
(Continued)

OTHER PUBLICATIONS

International Search Report issued in International Patent Application No. PCT/JP2018/029392, dated Nov. 6, 2018.
(Continued)

*Primary Examiner* — Sisay Yacob
(74) *Attorney, Agent, or Firm* — Greenblum & Bernstein, P.L.C.

(57) ABSTRACT

To enable a risk of collision between moving objects such as a pedestrian and a vehicle to be quickly and accurately determined in a roadside device, when the roadside device receives a message including state information indicating that a pedestrian is in a risky state from a pedestrian terminal, the roadside device acquires position information of a vehicle present around the pedestrian in the risky state based on a result of detecting vehicles on roads by a radar, determines a risk of collision between the pedestrian in the risky state and the vehicle based on the position information of the vehicle, and when the risk of
(Continued)

collision exists, transmits a message including alarm information indicating that the risk of collision exists to the terminal.

7 Claims, 15 Drawing Sheets

(58) Field of Classification Search
CPC .. G01S 2013/9323; G01S 7/003; G01S 7/415; G08G 1/005; G08G 1/0116; G08G 1/04; G08G 1/095; G08G 1/164; G08G 1/166; H04L 67/12; H04W 4/02; H04W 4/025; H04W 4/44
See application file for complete search history.

(56) References Cited

U.S. PATENT DOCUMENTS

| | | | |
|---|---|---|---|
| 2017/0018187 A1* | 1/2017 | Kim | ........................ G08G 1/164 |
| 2018/0261014 A1* | 9/2018 | Seo | ........................ G06T 19/006 |

FOREIGN PATENT DOCUMENTS

| | | |
|---|---|---|
| JP | 2005-301898 | 10/2005 |
| JP | 2007-272598 | 10/2007 |
| JP | 2008-59068 | 3/2008 |
| JP | 2009-75703 | 4/2009 |
| JP | 2009-211397 | 9/2009 |
| JP | 2011-118519 | 6/2011 |

OTHER PUBLICATIONS

Japan Office Action issued in Japan Patent Application No. 2017-194135, dated Aug. 3, 2021, together with English translation thereof.

China Office Action issued in China Patent Application No. 201880064680.X, dated Sep. 22, 2021, together with English translation thereof.

* cited by examiner

Fig.6
message transmitted from pedestrian terminal
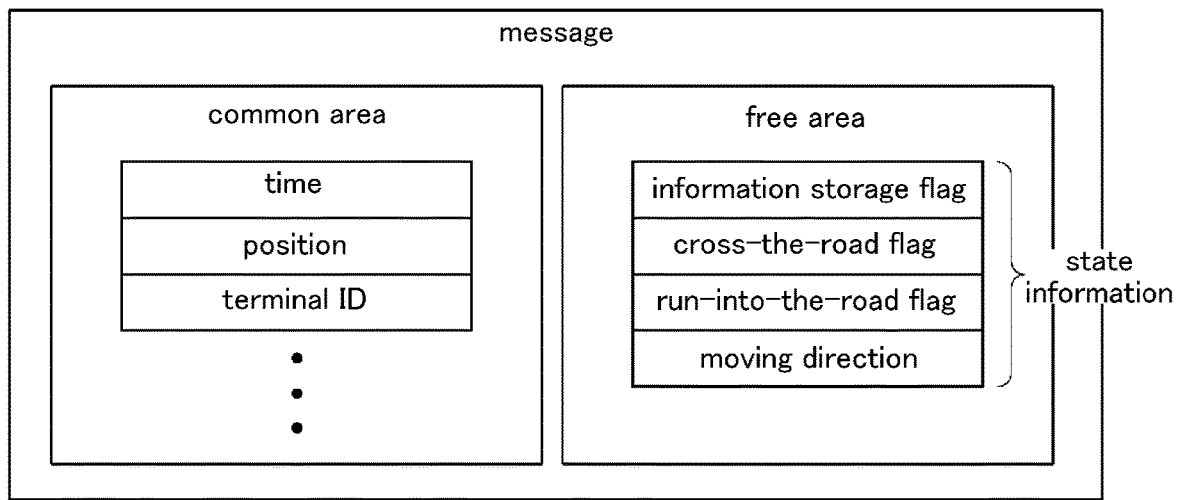
(A)
message transmitted from roadside device
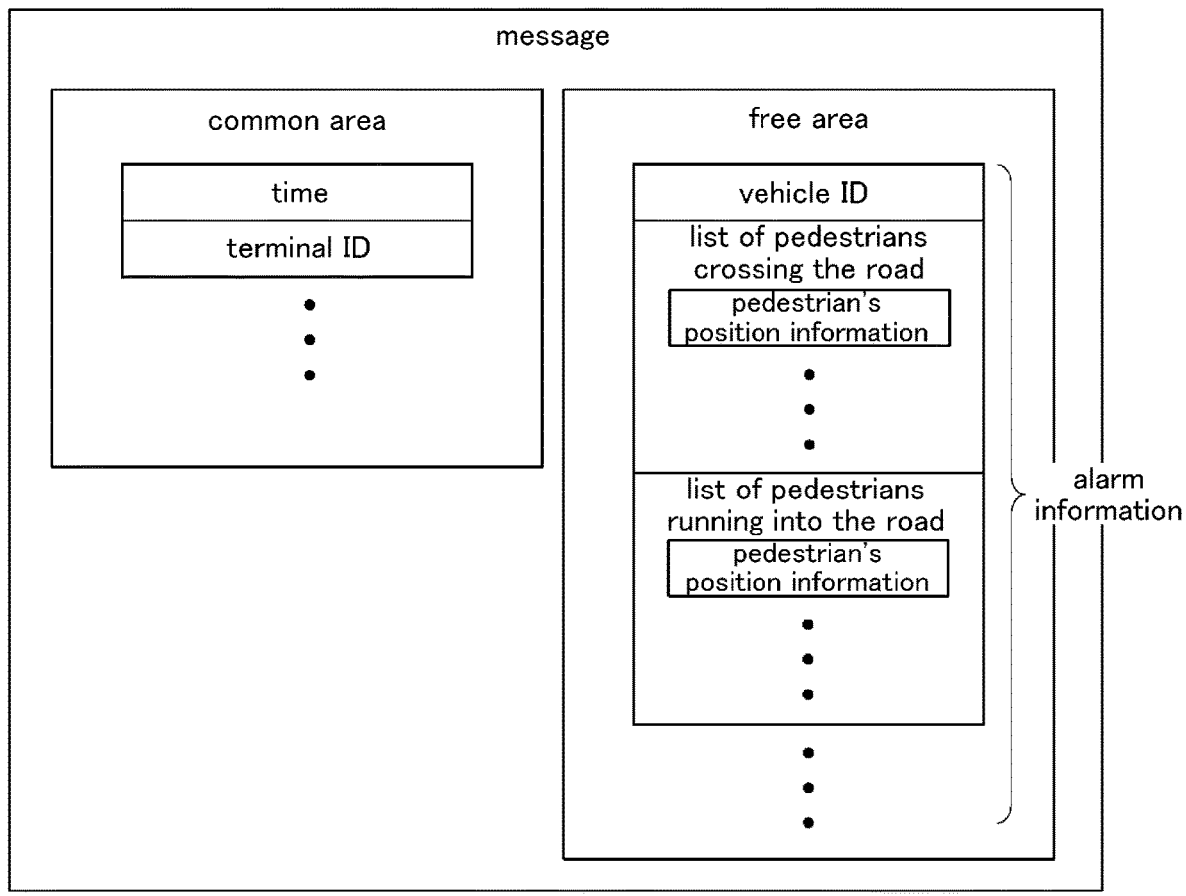
(B)

Fig.10
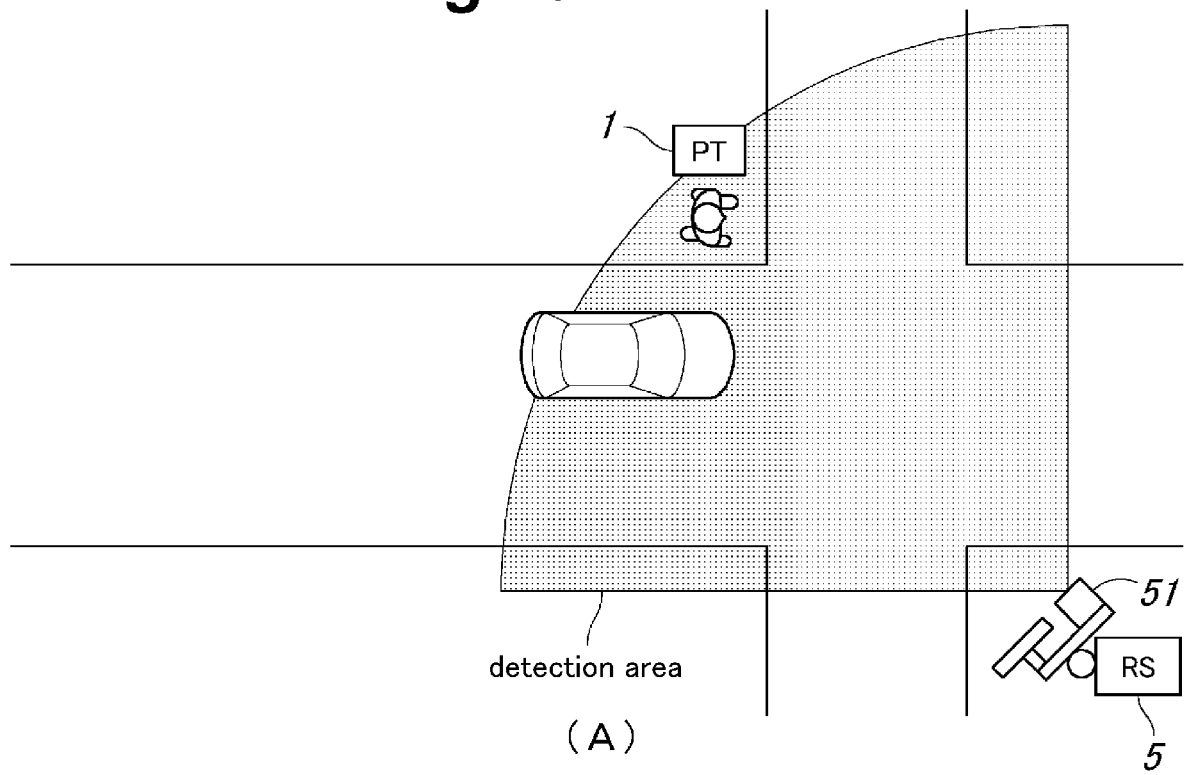
detection area
(A)
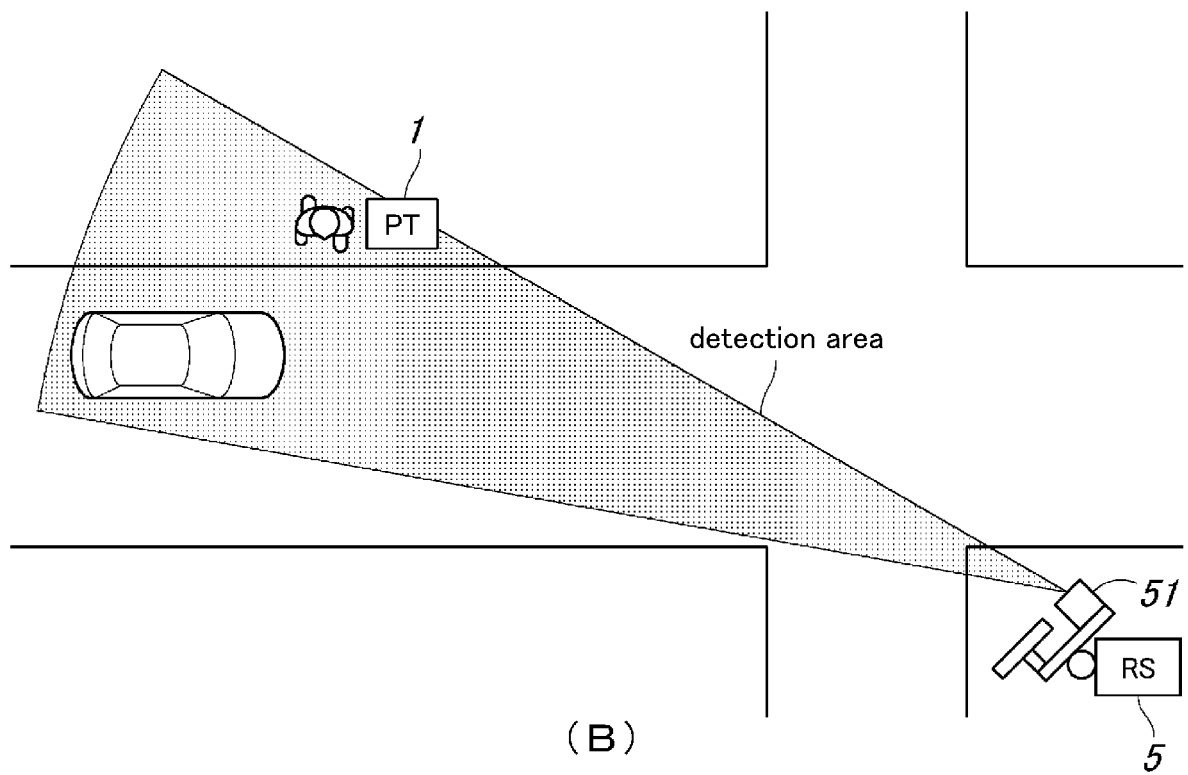
detection area
(B)

Fig.15
message transmitted from in-vehicle terminal
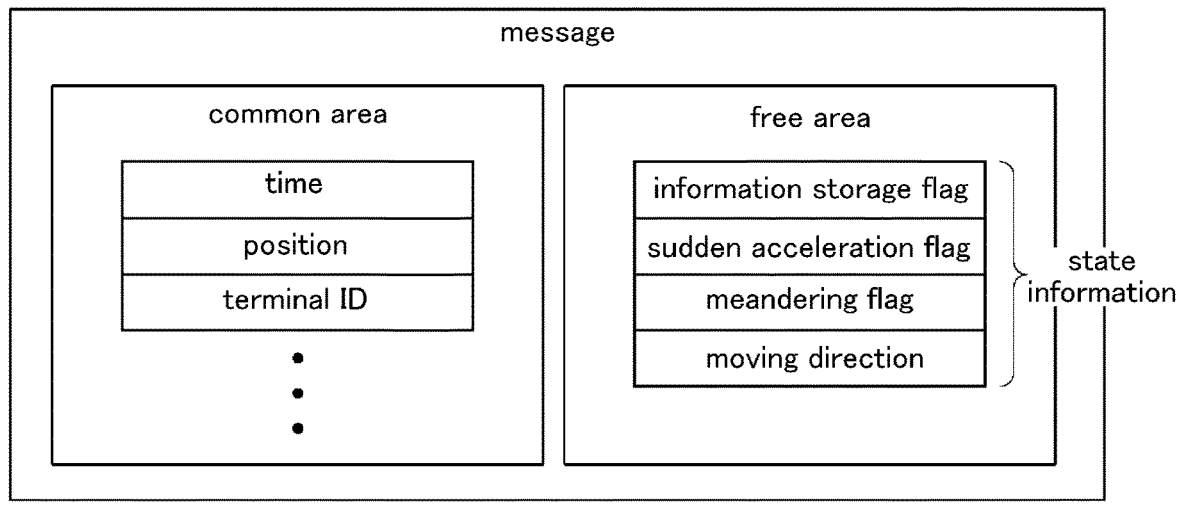
(A)
message transmitted from roadside device
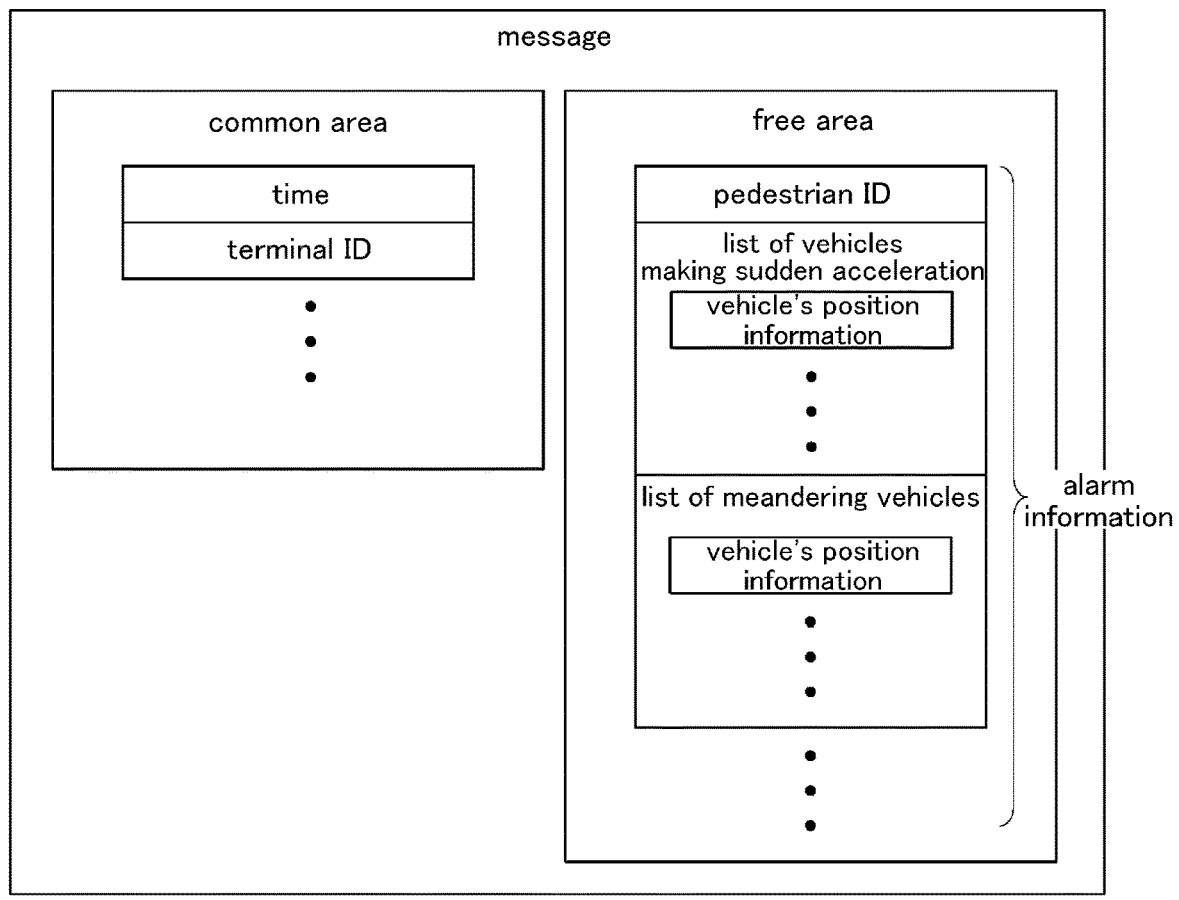
(B)

ROADSIDE DEVICE, COMMUNICATION SYSTEM, AND DANGER DETECTION METHOD

TECHNICAL FIELD

The present invention relates to a roadside device disposed on or near a road, a communication system including a terminal device configured to be carried by a moving object and a roadside device, and a risk detection method for detecting a risk of collision between moving objects that are present around a roadside device disposed on or near a road.

BACKGROUND ART

In recent years, studies have been in progress for the practical and widespread use of safe driving assistance wireless systems utilizing ITS (Intelligent Transport System). In such safe driving assistance wireless systems, in-vehicle terminals mounted in vehicles communicate with each other by ITS communication (vehicle-to-vehicle communication), and the in-vehicle terminals communicate with roadside devices disposed on or near roads by ITS communication in which (roadside-to-vehicle communication), whereby messages including vehicles' position information and other information are exchanged and necessary alerts are provided to the drivers of the vehicles in order to prevent accidents.

In addition, in recent years, ITS communication by which pedestrian terminals carried by pedestrians communicate with in-vehicle terminals (pedestrian-to-vehicle communication) has been proposed in order to prevent pedestrian accidents. In this pedestrian-to-vehicle communication, a pedestrian terminal and an in-vehicle terminal directly transmit messages including the position information and the like to each other so that the presence of the pedestrian is notified to the in-vehicle terminal and the presence of the vehicle is notified to the pedestrian terminal, which enables alerts to be timely provided to both the pedestrian and the vehicle driver, and thus, the pedestrian-to-vehicle communication is expected to be highly effective in preventing traffic accidents involving pedestrians.

Further, there is known a technology in which a roadside device equipped with a radar (object recognition sensor) is installed in an accident-prone place such as an intersection to monitor moving objects (pedestrians and vehicles) around the roadside device by using the radar so that, when it is determined that there is a risk of collision between moving objects, the presence of risk of collision is notified to the in-vehicle terminal(s) of the related vehicle(s) (see Patent Document 1).

PRIOR ART DOCUMENT(S)

Patent Document(s)

Patent Document 1: JP2007-272598A

SUMMARY OF THE INVENTION

Task to be Accomplished by the Invention

Incidentally, in the collision determination for determining a risk of collision between moving objects, if not only the position, the moving speed, and the moving direction of each moving object, but also a risky state of the moving object (e.g. a pedestrian taking a risky action such as running into the roadway) is grasped and the collision determination is performed preferentially for the moving objects in the risky state, the collision determination can be performed quickly and with high accuracy.

However, in the above-described conventional art, the roadside device needs to monitor the risky state of all moving objects that are present around the roadside device, and therefore, the burden on the roadside device is large, and in a situation where there are many moving objects, the collision determination cannot be made quickly. Also, in object detection using a radar or the like, since the resolution is limited, it is not possible to accurately detect small movements of each pedestrian (such as the movement of the pedestrian changing the body direction). Therefore, risky actions of the pedestrians cannot be detected in a satisfactory manner and the collision determination cannot be performed with high accuracy.

In view of the above, a primary object of the present invention is to provide a roadside device, a communication system, and a risk detection method that can quickly and accurately determine a risk of collision between moving objects.

Means to Accomplish the Task

The roadside device of the present invention is a roadside device disposed on or near a road, comprising: an object detector configured to detect moving objects on roads; a communication device configured to communicate with a terminal device carried by a moving object; and a controller that, when a message including state information indicating that the moving object is in a risky state is received by the communication device from the terminal device, acquires position information of another moving object present around the moving object in the risky state based on a detection result of the object detector, and determines a risk of collision between the moving objects based on the position information of the other moving object.

The communication system of the present invention is a communication system including a terminal device configured to be carried by a moving object and a roadside device disposed on or near a road, wherein the terminal device comprises: a state detector configured to detect a state of the moving object; a first communication device configured to perform ITS communication; and a first controller that, when detecting a risky action of the moving object based on a detection result of the state detector, transmits a message including state information indicating that the moving object is in a risky state from the first communication device, and wherein the roadside device comprises: an object detector configured to detect moving objects on roads; a second communication device configured to perform ITS communication; and a second controller that, when the message including the state information is received by the second communication device from the terminal device, acquires position information of another moving object present around the moving object in the risky state based on a detection result of the object detector, and determines a risk of collision between the moving objects based on the other position information of the moving object.

The risk detection method of the present invention is a risk detection method for detecting, in a roadside device disposed on or near a road, a risk of collision between moving objects present around the roadside device, the method comprising: when a message including state information indicating that a moving object is in a risky state is received from a terminal device carried by the moving object, acquiring position information of another moving object present around the moving object in the risky state based on a result of detecting moving objects on roads by object detection; and determining a risk of collision between the moving objects based on the position information of the other moving object.

Effect of the Invention

According to the present invention, since it is notified in advance from the terminal device of the moving object (pedestrian or vehicle) that the moving object is in a risky state, the burden of the process on the roadside device when performing the collision determination is reduced. Further, the terminal device of the moving object can detect a detailed moving state of the moving object and notify it to the roadside device. Thereby, a risk of collision between moving objects can be determined quickly and accurately in the roadside device.

BRIEF DESCRIPTION OF THE DRAWINGS

FIG. 6 is an explanatory diagram illustrating contents of messages transmitted from the pedestrian terminal 1 and the roadside device 5 according to the first embodiment;

FIG. 10 is an explanatory diagram illustrating an outline of control performed by a roadside device 5 according to a second embodiment;

FIG. 15 is an explanatory view showing contents of messages transmitted from the in-vehicle terminal 3 and the roadside device 5 according to the fourth embodiment.

MODES FOR CARRYING OUT THE INVENTION

Figure 1:
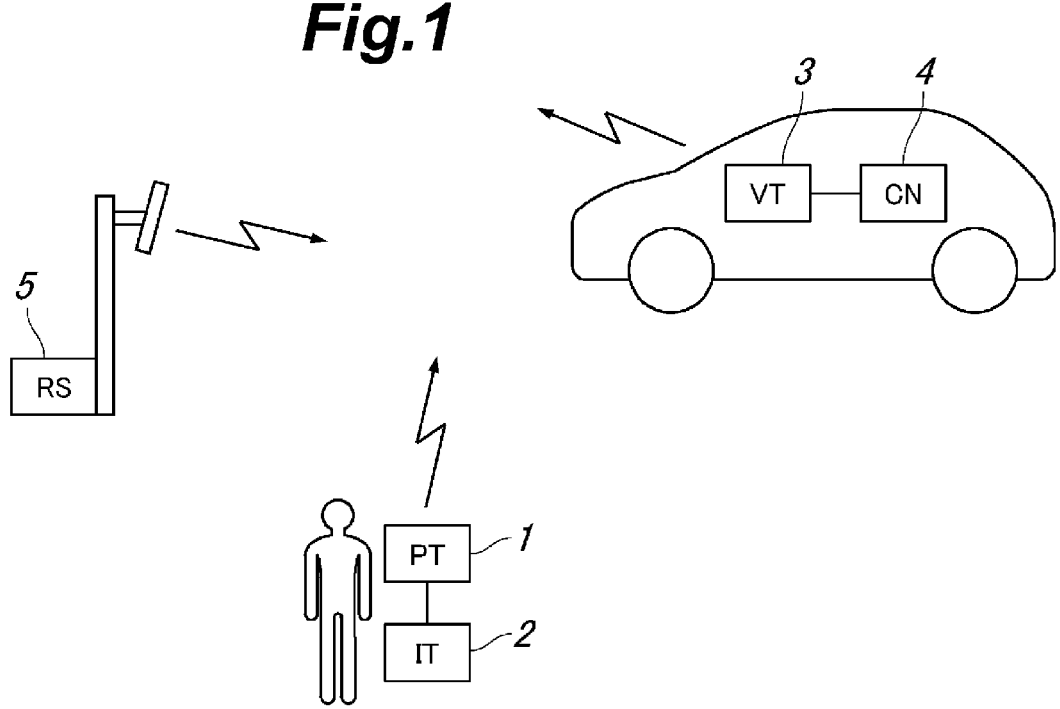
FIG. 1 is a diagram showing an overall configuration of a communication system according to a first embodiment.

A first aspect of the present invention made to achieve the above-described object is a roadside device disposed on or near a road, comprising: an object detector configured to detect moving objects on roads; a communication device configured to communicate with a terminal device carried by a moving object; and a controller that, when a message including state information indicating that the moving object is in a risky state is received by the communication device from the terminal device, acquires position information of another moving object present around the moving object in the risky state based on a detection result of the object detector, and determines a risk of collision between the moving objects based on the position information of the other moving object.

According to this, since it is notified in advance from the terminal device of the moving object (pedestrian or vehicle) that the moving object is in a risky state, the burden of the process on the roadside device when performing the collision determination is reduced. Further, the terminal device of the moving object can detect a detailed moving state of the moving object and notify it to the roadside device. Thereby, a risk of collision between moving objects can be determined quickly and accurately in the roadside device. In addition, even if moving objects present around the moving object in the risky state do not have a function of ITS communication, it is possible to reliably detect a moving object having a risk of collision by the object detection performed by the roadside device.

In a second aspect of the present invention, when the risk of collision exists, the controller transmits a message including alarm information indicating that the risk of collision exists from the communication device to the terminal device.

According to this, it is possible to notify that there is a risk of collision to a driver of a vehicle equipped with a terminal device capable of ITS communication or a pedestrian carrying such a terminal device.

In a third aspect of the present invention, when the risk of collision exists, the controller controls an alarm device disposed on or near a road to notify that the risk of collision exists.

According to this, it is possible to notify that there is a risk of collision to a driver of a vehicle not equipped with a terminal device capable of ITS communication or a pedestrian not carrying such a terminal device. Note that the alarm device may be configured to notify that there is a risk of collision by lighting a lamp or displaying a screen. Also, a configuration may be made such that a voice output is used to notify that there is a risk of collision.

In a fourth aspect of the present invention, the controller is configured to determine position information of the moving object based on position information of the moving object included in the message received by the communication device and position information of the moving object obtained from the detection result of the object detector.

According to this, the position information of the moving object can be acquired with high accuracy.

In a fifth aspect of the present invention, the controller is configured to control a detection area of the object detector based on position information of the terminal device included in the message received by the communication device such that a predetermined area around the moving object in the risky state is contained in the detection area.

According to this, a pedestrian(s) or vehicle(s) present around the pedestrian or vehicle in the risky state can be reliably detected by the object detection, whereby the position information of such a pedestrian(s) or vehicle(s), which may include a driver of a vehicle not equipped with a terminal device capable of ITS communication and/or a pedestrian not carrying such a terminal, can be obtained without fail.

In a sixth aspect of the present invention, the controller is configured to change a detection angle of the object detector depending on a distance between the terminal device and the roadside device.

According to this, even a moving object at a long distance from the roadside device can be detected.

A seventh aspect of the invention is a communication system including a terminal device configured to be carried by a moving object and a roadside device disposed on or near a road, wherein the terminal device comprises: a state detector configured to detect a state of the moving object; a first communication device configured to perform ITS communication; and a first controller that, when detecting a risky action of the moving object based on a detection result of the state detector, transmits a message including state information indicating that the moving object is in a risky state from the first communication device, and wherein the roadside device comprises: an object detector configured to detect moving objects on roads; a second communication device configured to perform ITS communication; and a second controller that, when the message including the state information is received by the second communication device from the terminal device, acquires position information of another moving object present around the moving object in the risky state based on a detection result of the object detector, and determines a risk of collision between the moving objects based on the position information of the other moving object.

According to this, similarly to the first aspect, a risk of collision between moving objects can be determined quickly and accurately in the roadside device.

An eighth aspect of the present invention is a risk detection method for detecting, in a roadside device disposed on or near a road, a risk of collision between moving objects present around the roadside device, the method comprising: when a message including state information indicating that a moving object is in a risky state is received from a terminal device carried by the moving object, acquiring position information of another moving object present around the moving object in the risky state based on a result of detecting moving objects on roads by object detection; and determining a risk of collision between the moving objects based on the position information of the other moving object.

According to this, similarly to the first aspect, a risk of collision between moving objects can be determined quickly and accurately in the roadside device.

Embodiments of the present invention will be described below with reference to the drawings.

First Embodiment

FIG. 1 is a diagram showing an overall configuration of a communication system according to a first embodiment of the present invention.

This communication system includes a pedestrian terminal 1 (terminal device) and a mobile information terminal 2 carried by a pedestrian, an in-vehicle terminal 3 (terminal device) and a car navigation device 4 mounted on a vehicle (moving object), and a roadside device 5 (roadside device). Roadside-to-vehicle communication is performed between the in-vehicle terminal 3 and the roadside device 5, and roadside-to-pedestrian communication is performed between the pedestrian terminal 1 and the roadside device 5.

Note that pedestrian-to-vehicle communication may be performed between the pedestrian terminal 1 and the in-vehicle terminal 3.

In normal pedestrian-to-vehicle communication, a message, which includes required information such as position information, is transmitted between the pedestrian terminal 1 and the in-vehicle terminal 3. In this pedestrian-to-vehicle communication, such messages are transmitted through ITS wireless communication, namely, wireless communication using a frequency band adopted in safe driving assistance wireless systems utilizing an ITS (Intelligent Transport System), such as 700 MHz band or 5.8 GHz band.

In the present embodiment, roadside-to-pedestrian communication for transmitting and receiving messages between the roadside device 5 and the pedestrian terminal 1 and roadside-to-vehicle communication for transmitting and receiving messages between the roadside device 5 and the in-vehicle terminal 3 are performed, but it is to be noted that the roadside-to-pedestrian communication and the roadside-to-vehicle communication are ITS wireless communication similar to the pedestrian-to-vehicle communication, and the messages transmitted and received in the roadside-to-pedestrian communication and the roadside-to-vehicle communication are based on the common specification (data configuration). Also, the messages are transmitted by broadcast, but information for a specific device can be transmitted by adding the identification information (terminal ID) of the destination device to the message.

The pedestrian terminal 1 is connected to the mobile information terminal 2. The mobile information terminal 2 may be a smartphone, a mobile phone, a tablet terminal, a wearable terminal, or other types of terminals. When the pedestrian terminal 1 determines, as a result of determination of the state of its own or communication of messages with the roadside device 5 and/or the in-vehicle terminal 3, that an alert needs to be provided, the pedestrian terminal 1 outputs an alerting instruction to the mobile information terminal 2, which, in accordance with the alerting instruction from the pedestrian terminal 1, generates an alert output (e.g. voice output or vibration) to the pedestrian.

The in-vehicle terminal 3 is connected to the car navigation device 4. The car navigation device 4 provides route guidance to the driver. When the in-vehicle terminal 3 determines, based on communication of messages with the roadside device 5 and/or the pedestrian terminal 1, that an alert needs to be provided, the in-vehicle terminal 3 outputs an alerting instruction to the car navigation device 4, which, in accordance with the alerting instruction from the in-vehicle terminal 3, generates an alert output (e.g. voice output or vibration) to the driver.

In some cases, the pedestrian terminal 1 may be built in the mobile information terminal 2, and the in-vehicle terminal 3 may be built in the car navigation device 4.

The pedestrian terminal 1 itself may generate an alert output. Similarly, the in-vehicle terminal 3 itself may generate an alert output. The in-vehicle terminal 3 may be configured to communicate with the mobile information terminal 2 carried by the driver, and cause the mobile information terminal 2 to generate an alert output to the driver.

Figure 2:
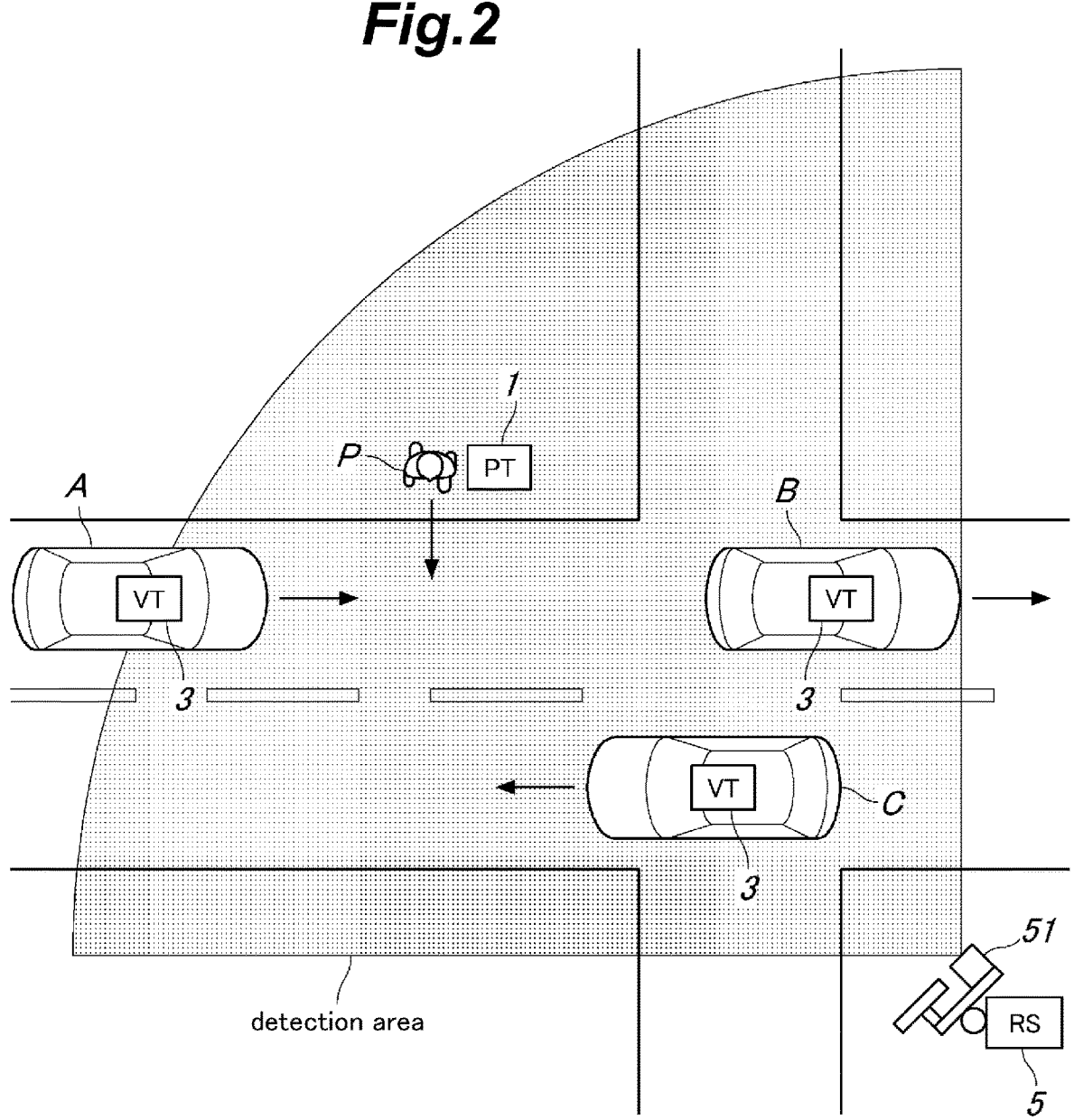
FIG. 2 is an explanatory diagram illustrating an outline of the communication system according to the first embodiment.

Next, an outline of the communication system according to the first embodiment will be described. FIG. 2 is an explanatory diagram illustrating an outline of the communication system.

The roadside device 5 includes a radar 51 (object detector), and the radar 51 is configured to detect pedestrians and vehicles (moving objects) on roads. The roadside device 5 acquires the position information of the pedestrians and the vehicles based on the detection result of the radar 51. Further, the roadside device 5 receives a message transmitted from each pedestrian terminal 1 and acquires the position information of the pedestrian included in the message. The roadside device 5 also receives a message transmitted from each in-vehicle terminal 3 and acquires the position information of the vehicle included in the message. Then, the position information of the pedestrians and the vehicles acquired by the radar 51 is compared with the position information of the pedestrians and the vehicles acquired from the messages to determine the position information of the pedestrians and the vehicles.

Each pedestrian terminal 1 has a function of detecting the pedestrian's risky action such as crossing the road or running into the road, and if the pedestrian takes a risky action, the pedestrian terminal 1 transmits, by ITS communication, a message including state information indicating that the pedestrian is in a risky state.

When the roadside device 5 receives the messages from the pedestrian terminals 1, the roadside device 5 identifies a pedestrian(s) in a risky state based on the position information and the state information included in each message. The roadside device 5 also receives a message from each in-vehicle terminal 3. When it is determined that one or more vehicles are present around some pedestrian based on the position information of the pedestrian and the vehicles as well as the detection result of the radar 51, the roadside device 5 performs collision determination as to whether there is a possibility that some vehicle may collide with the pedestrian based on the information such as the position, traveling direction, and speed of each vehicle. Then, when there is some vehicle that may collide with the pedestrian, the roadside device 5 transmits a message including alarm information by ITS communication. The in-vehicle terminal 3 of a vehicle A that has received this message alerts the driver of the vehicle A.

The example shown in FIG. 2 illustrates a case where a pedestrian P runs into the road as an example of a risky action. There are vehicles A to C around the pedestrian P, but only the vehicle A has a possibility of colliding with the pedestrian P according to the positions and traveling directions of the vehicles A to C. Therefore, the roadside device 5 transmits a message including alarm information by ITS communication, and the in-vehicle terminal 3 of the vehicle A alerts the driver of the vehicle A.

Figure 3:
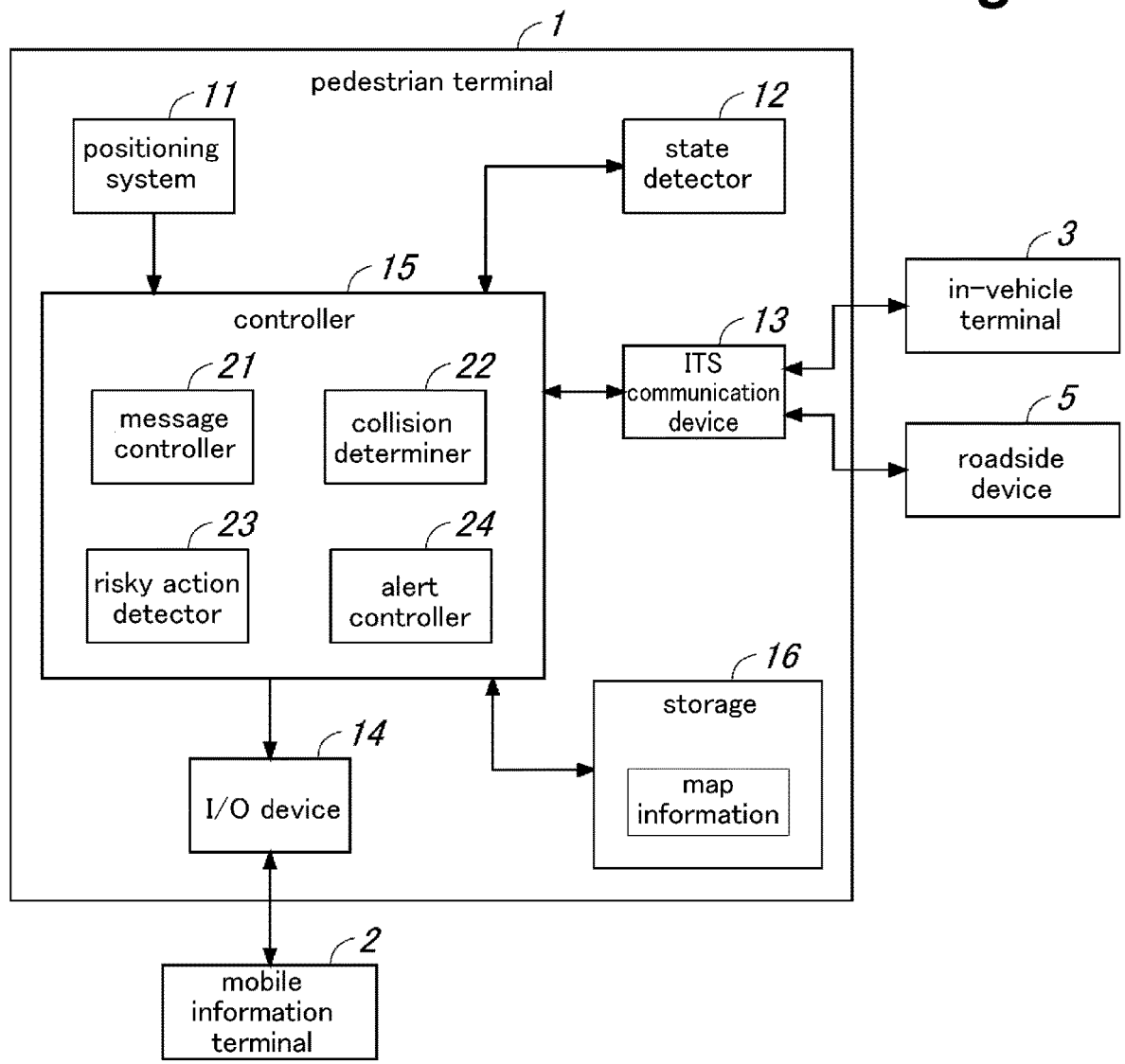
FIG. 3 is a block diagram showing a schematic configuration of a pedestrian terminal 1 according to the first embodiment.

Next, a schematic configuration of the pedestrian terminal 1 according to the first embodiment will be described. FIG. 3 is a block diagram showing the schematic configuration of the pedestrian terminal 1.

The pedestrian terminal 1 includes a positioning system 11, a state detector 12, an ITS communication device 13, an I/O device 14, a controller 15, and a storage 16.

The positioning system 11 measures the position of the own pedestrian terminal by using a satellite positioning system such as GPS (Global Positioning System), QZSS (Quasi-Zenith Satellite System), or GLONASS (Global Navigation Satellite System) to acquire the position information (longitude and latitude) of the own pedestrian terminal. It is also possible to acquire the position information of the own pedestrian terminal by using the positioning function of the mobile information terminal 2.

The state detector 12 detects a state (acceleration, three-axis angle, etc.) of the pedestrian indicating the movement and posture of the pedestrian. The state detector 12 is constituted of an inertial measurement unit (IMU), for example, and has all or part of the functions of an acceleration sensor, a geomagnetic sensor, and a gyro sensor.

The ITS communication device 13 transmits and receives messages to and from the roadside device 5 by ITS communication (roadside-to-pedestrian communication). The ITS communication device 13 may also transmit and receive messages to and from the in-vehicle terminals 3 by ITS communication (pedestrian-to-vehicle communication). Note that the messages are transmitted by broadcast, but may be transmitted by unicast or multicast.

The I/O device 14 exchanges information with the mobile information terminal 2. The mobile information terminal 2 provides an alert to the pedestrian based on the information provided from the I/O device 14.

The storage 16 stores map information (digital map data), programs executed by a processor constituting the controller 15, and other information. Note that the map information may be acquired from the mobile information terminal 2.

The controller 15 includes a message controller 21, a collision determiner 22, a risky action detector 23, and an alert controller 24. The controller 15 is comprised primarily of a processor, and each functional unit of the controller 15 is implemented by causing the processor to execute a program stored in the storage 16.

The message controller 21 controls transmission of messages including pedestrian information such as a pedestrian ID (terminal ID) and position information. In the present embodiment, the message controller 21 transmits a message including the pedestrian information periodically from the ITS communication device 13. In addition, when the risky action detector 23 detects that the pedestrian is taking a risky action (crossing the road or running into the road), the message controller 21 transmits a message including state information indicating that the pedestrian is taking a risky action from the ITS communication device 13.

The collision determiner 22 checks the messages received from the roadside device 5 to find whether there is a risk that some vehicle may collide with the pedestrian carrying the pedestrian terminal 1. The collision determiner 22 may perform the collision determination by itself based on the messages received from the in-vehicle terminals 3.

The risky action detector 23 acquires road information around the pedestrian (information on the centerline and width of the nearby roads) from the map information in the storage 16, and based on the road information, the position information of the pedestrian acquired by the positioning system 11, and the detection result of the state detector 12, detects that the pedestrian is taking a risky action (such as crossing the road or running into the road).

Specifically, when the pedestrian is on the roadway and is moving in a road-crossing direction, the risky action detector 23 determines that the pedestrian is crossing the road. At this time, the risky action detector 23 may determine whether or not the pedestrian is on the roadway based on the pedestrian's position information and the road information. Also, the risky action detector 23 may determine whether or not the pedestrian is moving in the road-crossing direction based on the moving direction obtained from the pedestrian's position information, the movement of the pedestrian obtained from the detection result of the state detector 12, and the road information.

In addition, when the pedestrian makes a sudden acceleration or a sudden turn (sudden change of direction) and the distance (approach distance) from the current position of the pedestrian to the roadway (risky area) is shorter than a predetermined distance, the risky action detector 23 determines that the pedestrian is running into the road. At this time, the risky action detector 23 may determine whether or not the pedestrian has made a sudden acceleration or a sudden turn based on the detection result of the state detector 12. Also, the risky action detector 23 may determine whether or not the approach distance is shorter than the predetermined distance based on the pedestrian's position information and the road information.

It is also possible to determine that the pedestrian is running into the road when the pedestrian makes a sudden acceleration or a sudden turn and the time (approach time) required for the pedestrian to reach the roadway (risky area) from the current position is shorter than a predetermined time. In this case, the risky action detector 23 may determine whether or not the approach time is shorter than the predetermined time based on the moving speed, which is obtained from the change of the pedestrian's position information, and the road information.

The alert controller 24 alerts the pedestrian when it is determined by the collision determiner 22 that there is a risk that some vehicle may collide with the pedestrian. In the present embodiment, the alert controller 24 provides an alerting instruction to the mobile information terminal 2 via the I/O device 14, and upon receiving the alerting instruction, the mobile information terminal 2 generates an alert output (e.g. voice output or vibration) to the pedestrian.

The alert controller 24 also alerts the pedestrian when the risky action detector 23 detects that the pedestrian is taking a risky action (such as crossing the road or running into the road).

Figure 4:
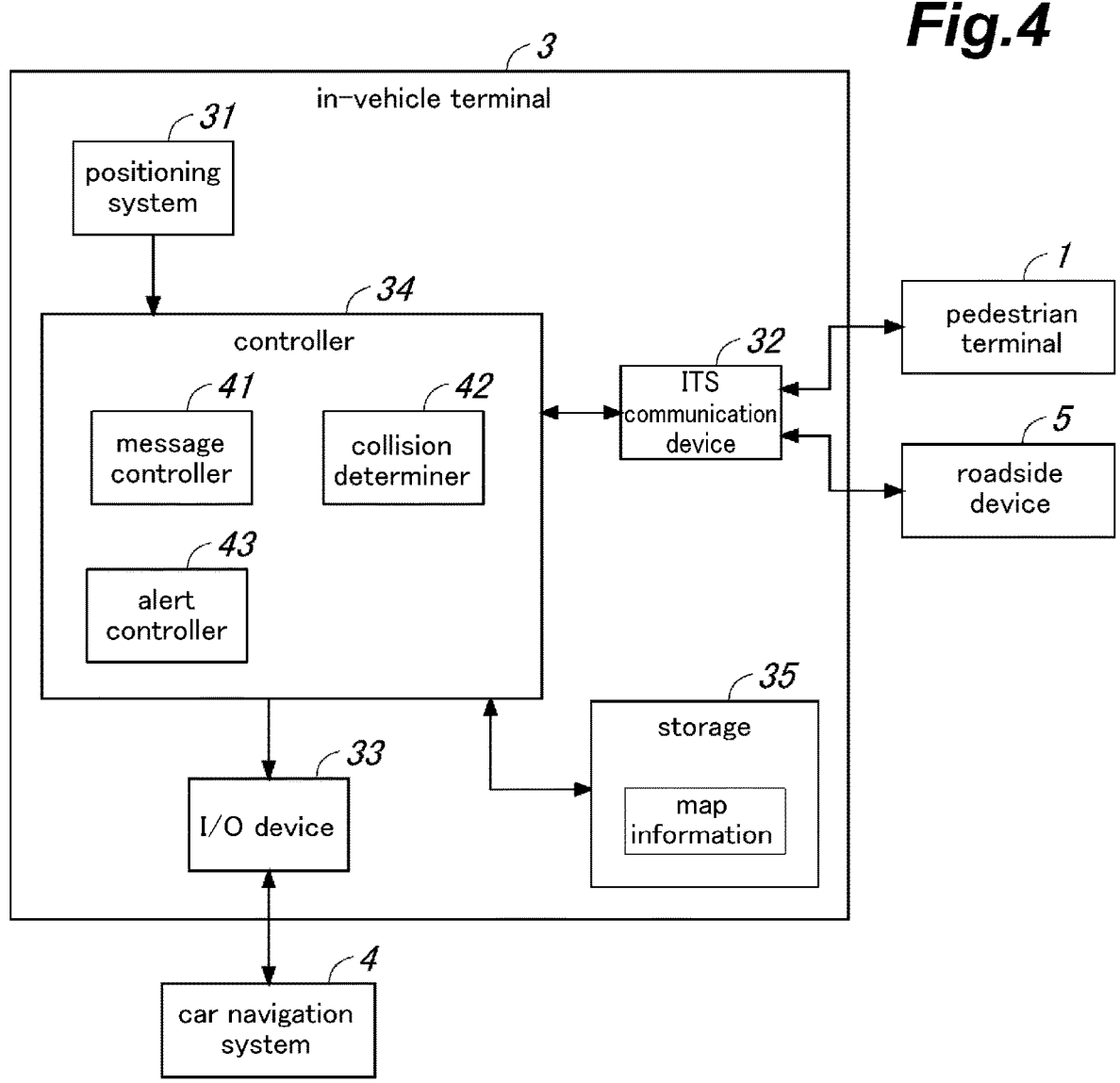
FIG. 4 is a block diagram showing a schematic configuration of an in-vehicle terminal 3 according to the first embodiment.

Next, a schematic configuration of the in-vehicle terminal 3 according to the first embodiment will be described. FIG. 4 is a block diagram showing a schematic configuration of the in-vehicle terminal 3.

The in-vehicle terminal 3 includes a positioning system 31, an ITS communication device 32, an I/O device 33, a controller 34, and a storage 35.

The positioning system 31 measures the position of the own in-vehicle terminal by using a satellite positioning system such as GPS, QZSS, etc. to acquire the position information (longitude and latitude) of the own in-vehicle terminal. The positioning system 31 may acquire the position information of the own in-vehicle terminal by using the positioning function of the car navigation device 4.

The ITS communication device 32 transmits and receives messages to and from the roadside device 5 by ITS communication (roadside-to-vehicle communication). The ITS communication device 32 may also transmit and receive messages to and from the pedestrian terminals 1 by ITS communication (pedestrian-to-vehicle communication). Note that the messages are transmitted by broadcast, but may be transmitted by unicast or multicast.

The I/O device 33 exchanges information with the car navigation device 4. The car navigation device 4 provides an alert to the driver based on the information provided from the I/O device 33.

The storage 35 stores map information, programs executed by a processor constituting the controller 34, and other information. Note that the map information may be acquired from the car navigation device 4.

The controller 34 includes a message controller 41, a collision determiner 42, and an alert controller 43. The controller 34 is comprised primarily of a processor, and each functional unit of the controller 34 is implemented by causing the processor to execute a program stored in the storage 35.

The message controller 41 controls transmission of messages including vehicle information such as a vehicle ID (terminal ID) and position information. In the present embodiment, the message controller 41 transmits a message including the vehicle information periodically from the ITS communication device 32.

The collision determiner 42 checks the information (such as position information) of the own vehicle acquired by the positioning system 31 and the messages received from the roadside device 5 to find whether there is a risk that the own vehicle may collide with some pedestrian. The collision determiner 42 may determine whether or not there is a risk that the own vehicle may collide with some pedestrian by itself based on the pedestrian information (such as position information) included in the messages received from the pedestrian terminals 1.

The alert controller 43 alerts the driver of the own vehicle when it is determined by the collision determiner 42 that there is a risk that the own vehicle may collide with some pedestrian. In the present embodiment, the alert controller 43 provides an alerting instruction to the car navigation device 4 via the I/O device 33, and upon receiving the alerting instruction, the car navigation device 4 generates an alert output (e.g. voice output or vibration) to the driver.

The alert controller 43 also alerts the driver of the own vehicle when the alert controller 43 receives a message including alarm information from the roadside device 5 through the ITS communication device 32 and the vehicle ID of the own vehicle is included in the alarm information. At this time, the alert controller 43 may cause an icon(s) representing the pedestrian(s) who may collide with the own vehicle to be displayed on the screen of the car navigation device 4 in accordance with the position information of the pedestrian(s) included in the alarm information.

In the present embodiment, the driver is alerted when there is a risk that the own vehicle may collide with some pedestrian, but in a case where the vehicle has an automatic driving function, the vehicle may be controlled to avoid the collision.

Figure 5:
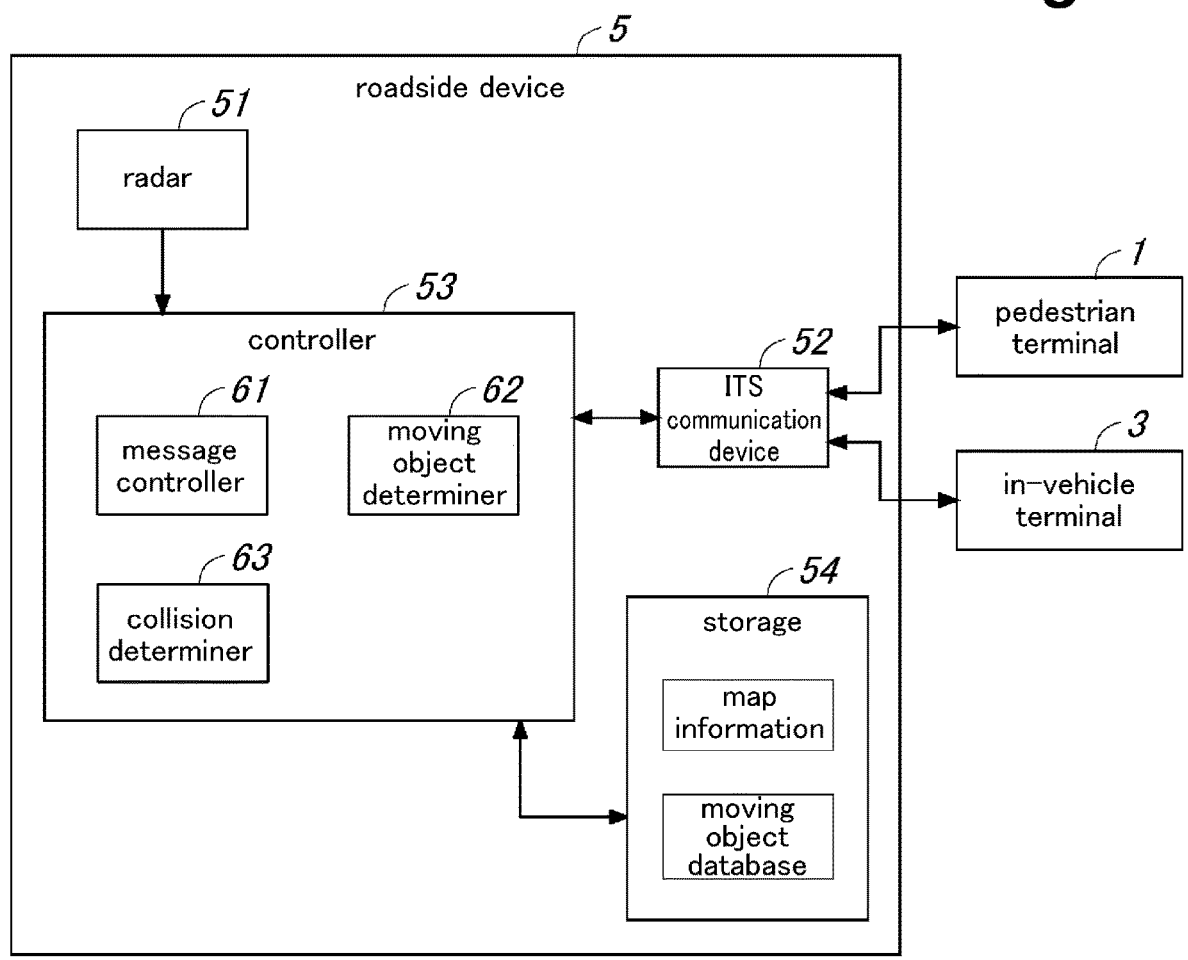
FIG. 5 is a block diagram showing a schematic configuration of a roadside device 5 according to the first embodiment.

Next, a schematic configuration of the roadside device 5 according to the first embodiment will be described. FIG. 5 is a block diagram showing a schematic configuration of the roadside device 5.

The roadside device 5 includes a radar 51 (object detector), an ITS communication device 52, a controller 53, and a storage 54.

The radar 51 detects objects (including moving objects such as pedestrians and vehicles) that are present on the roads around the own roadside device by emitting a radio wave and detecting a reflected wave thereof, and measures the direction in which each object is located and the distance to each object. Note that the radar 51 is not particularly limited, and may be a millimeter wave radar, a laser radar, or the like.

The ITS communication device 52 transmits and receives messages to and from the pedestrian terminals 1 by ITS communication (roadside-to-pedestrian communication), and transmits and receives messages to and from the in-vehicle terminals 3 by ITS communication (roadside-to-vehicle communication). Note that the messages are transmitted by broadcast, but may be transmitted by unicast or multicast.

The storage 54 stores map information, position information of the own roadside device, programs executed by a processor constituting the controller 15, and other information. The map information is adapted for a monitoring area around the own roadside device. This map information may be updated offline, but it is also possible to provide the roadside device 5 with a network communication device so that the map information can be updated by a management device via the network.

Further, the storage 54 stores registration information of a moving object database for managing the moving objects (pedestrians and vehicles) that are present in the monitoring area around the own roadside device.

The controller 53 includes a message controller 61, a moving object determiner 62, and a collision determiner 63. The controller 53 is comprised primarily of a processor, and each functional unit of the controller 53 is implemented by causing the processor to execute a program stored in the storage 54.

The message controller 61 controls transmission of messages to the pedestrian terminals 1 and the in-vehicle terminals 3. In the present embodiment, when the collision determiner 63 determines that there is a risk that some vehicle may collide with a pedestrian(s), the message controller 61 transmits a message including alarm information indicating the presence of risk that the vehicle may collide with the pedestrian(s) from the ITS communication device 52 such that the message is addressed to the in-vehicle terminal 3 of the vehicle having the risk of collision. In addition, the message controller 61 may transmit a message including alarm information to the pedestrian terminal(s) 1.

The moving object determiner 62 determines the position and state of the moving objects (pedestrians and vehicles) that are present on the roads around the own roadside device based on the messages received from the pedestrian terminals 1 and the in-vehicle terminals 3, the detection result of the radar 51, and the map information in the storage 54, and registers the information on each moving object (terminal ID, position information, and state information) in the moving object database of the storage 54.

Thereby, it is possible to complement the information on the moving objects and improve the accuracy thereof. That is, based on the detection result of the radar 51, information of the pedestrians not carrying the pedestrian terminals 1 or the vehicles not equipped with the in-vehicle terminals 3 can be acquired, whereby the information of the moving objects that cannot be obtained from the messages sent from the pedestrian terminals 1 and the in-vehicle terminals 3 can be complemented. In addition, by comparing the information notified by the messages with regard to the pedestrians carrying the pedestrian terminals 1 and the vehicles equipped with the in-vehicle terminals 3 with the information obtained from the detection result of the radar 51, it is possible to improve the accuracy of the information on the moving objects.

The collision determiner 63 extracts a pedestrian(s) in a risky state from the moving object database of the storage 54, and determines whether there is a risk that some vehicle may collide with some pedestrian taking a risky action based on the information (position information and the like) of the vehicles and pedestrians in the moving object database.

Next, the messages transmitted from the pedestrian terminal 1 and the roadside device 5 according to the first embodiment will be described. FIG. 6 is an explanatory view showing contents of the messages transmitted from the pedestrian terminal 1 and the roadside device 5.

In the present embodiment, when the pedestrian terminal 1 detects that the pedestrian carrying the pedestrian terminal 1 is taking a risky action (such as crossing the road or running into the road), the pedestrian terminal 1 generates a message including the position information of the pedestrian and the state information indicating that the pedestrian is taking a risky action and transmits the message by ITS communication.

At this time, as shown in (A) of FIG. 6, the message transmitted from the pedestrian terminal 1 is generated according to the message format for ITS communication. This message includes a common area for storing prescribed information and a free area in which a user can store arbitrary information, and the prescribed information such as time, position, and terminal ID is stored in the common area while the state information is stored in the free area.

In the present embodiment, the following information is stored in the free area as the state information: header information indicating whether or not state information related to a risky action is stored (information storage flag); information indicating whether or not the pedestrian is crossing the road (cross-the-road flag); information indicating whether or not the pedestrian is running into the road (run-into-the-road flag); and information on the moving direction.

Note that the bit configuration of the message is not particularly limited. Also, though in the example shown in (A) of FIG. 6, two flags respectively related to crossing the road and running into the road as risky actions are set, three or more flags may be set by increasing the types of risky actions. Further, in the example shown in (A) of FIG. 6, the types of risky actions (crossing the road and running into the road) are distinguished and notified, but it is also possible to store information indicating whether a risky action is taken in the free area without distinguishing between the types.

In the present embodiment, when the roadside device 5 determines that there is a risk that some vehicle may collide with a pedestrian(s), the roadside device 5 generates a message including alarm information indicating the presence of risk that the vehicle may collide with the pedestrian(s) and transmits the message by ITS communication such that the message is addressed to the in-vehicle terminal 3 of the vehicle having the risk of collision.

At this time, as shown in (B) of FIG. 6, the message transmitted from the roadside device 5 is generated according to the message format for ITS communication similarly to the message shown in (A) of FIG. 6, and the prescribed information such as time and terminal ID is stored in the common area while the alarm information is stored in the free area.

In the present embodiment, the vehicle ID of the vehicle having a risk of collision (terminal ID of the in-vehicle terminal 3) and pedestrian lists regarding the pedestrian(s) who may collide with the vehicle (pedestrian(s) taking a risky action) are stored in the free area as the alarm information. When there are multiple vehicles having a risk of collision, the vehicle ID and the pedestrian lists are stored in the free area for each such vehicle.

The pedestrian lists are stored for the respective types of risky actions (crossing the road and running into the road). The pedestrian list of the pedestrian(s) crossing the road is configured to store the position information of the pedestrian(s) who is/are crossing the road and may collide with the vehicle. The pedestrian list of the pedestrian(s) running into the road is configured to store the position information of the pedestrian(s) who is/are running into the road and may collide with the vehicle.

When the in-vehicle terminal 3 receives a message including the alarm information from the roadside device 5, the in-vehicle terminal 3 alerts the driver if the own vehicle ID is included in the alarm information of the message. Further, based on the pedestrian lists associated with the own vehicle ID, the in-vehicle terminal 3 extracts the pedestrian(s) who may collide with the vehicle and presents the position(s) of the extracted pedestrian(s) to the driver. For example, the in-vehicle terminal 3 causes an icon(s) representing the pedestrian(s) who may collide with the vehicle to be displayed on the screen of the car navigation device 4.

In this embodiment, since the types of risky actions (crossing the road and running into the road) are also notified from the roadside device 5 to the in-vehicle terminal 3, an alarm message corresponding to the type of risky action may be displayed on the screen of the car navigation device 4.

Note that the bit configuration of the message is not particularly limited. In the example shown in (B) of FIG. 6, two pedestrian lists respectively related to crossing the road and running into the road as risky actions are stored, but three or more pedestrian lists may be stored by increasing the types of risky actions. Also, in the example shown in (B) of FIG. 6, the pedestrian lists are stored separately for the respective types of risky actions (crossing the road and running into the road), but one pedestrian list may be stored without distinguishing between the types of risky actions. It is also possible to store one pedestrian list in which the pieces of position information are associated with the types of risky actions.

In the example shown in (B) of FIG. 6, the position information of each pedestrian is stored in the pedestrian list, but the pedestrian ID (the terminal ID of the pedestrian terminal 1) may be additionally stored. Further, when multiple pedestrians are close to each other, the multiple pedestrians may be grouped into one group so that one piece of position information is stored therefor.

Figure 7:
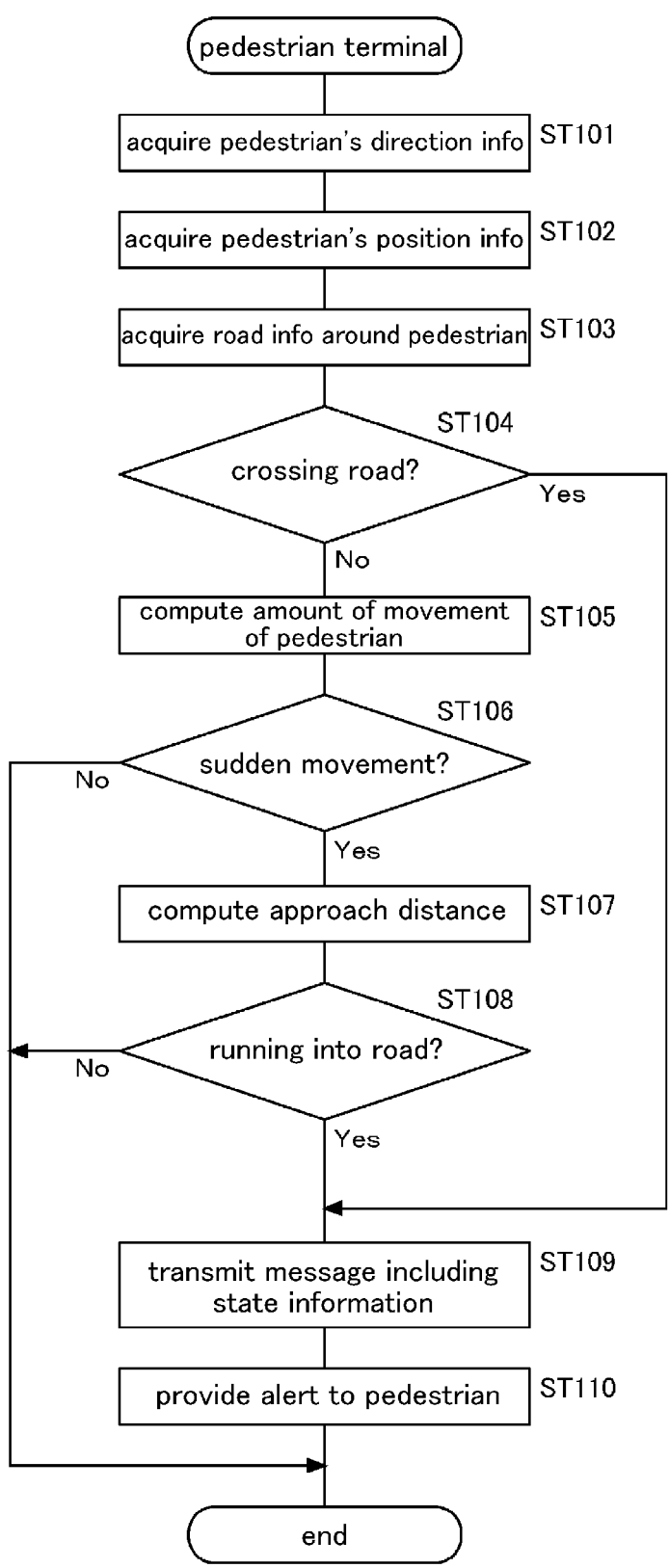
FIG. 7 is a flowchart showing an operation procedure of the pedestrian terminal 1 according to the first embodiment.

Next, an operation procedure of the pedestrian terminal 1 will be described. FIG. 7 is a flowchart showing the operation procedure of the pedestrian terminal 1.

In the pedestrian terminal 1, first, the risky action detector 23 acquires direction information regarding the moving direction of the pedestrian based on the detection result of the state detector 12 (ST101). Further, the risky action detector 23 acquires the position information of the pedestrian from the positioning system 11 (ST102). The risky action detector 23 also acquires road information around the pedestrian from the map information in the storage 16 (ST103). Then, based on the direction information and the position information of the pedestrian and the road information, the risky action detector 23 determines whether or not the pedestrian is crossing the road (roadway) (ST104). At this time, if the pedestrian is on the roadway and is moving in the road-crossing direction, it is determined that the pedestrian is crossing the road.

In a case where the pedestrian is crossing the road (Yes in ST104), a message including state information indicating that the pedestrian is crossing the road as a risky action is generated, and the message is transmitted by ITS communication (ST109). Subsequently, a process of alerting the pedestrian is performed in the alert controller 24 (ST110).

On the other hand, in a case where the pedestrian is not crossing the road (No in ST104), an amount of movement of the pedestrian is computed based on the detection result of the state detector 12 (ST105). Then, it is determined whether or not the pedestrian has made a sudden movement (sudden acceleration or sudden turn) (ST106). In a case where the pedestrian has made a sudden movement (Yes in ST106), the distance (approach distance) from the current position of the pedestrian to the roadway (risky area) is computed (ST107). Then, it is determined whether or not the pedestrian is running into the road based on the approach distance (ST108). At this time, if the approach distance is shorter than the predetermined distance, it is determined that the pedestrian is running into the road.

In a case where the pedestrian is running into the road (Yes in ST108), a message including state information indicating that the pedestrian is running into the road as a risky action is generated, and the message is transmitted from the ITS communication device 13 (ST109). Thereby, the roadside device 5 can receive the message including the state information indicating that the pedestrian is taking a risky action. Subsequently, a process of alerting the pedestrian is performed in the alert controller 24 (ST110).

On the other hand, in a case where the pedestrian has not made a sudden movement (No in ST106) or in a case where the pedestrian is not running into the road (No in ST108), the process terminates without performing further processing.

Note that running into the road is an action of the pedestrian suddenly moving toward the roadway (risky area) within the sidewalk (safe area), and is less risky than crossing the road in which the pedestrian is already on the roadway (risky area), and therefore, when it is determined that the pedestrian is crossing the road, the determination whether the pedestrian is running into the road is omitted.

Figure 8:
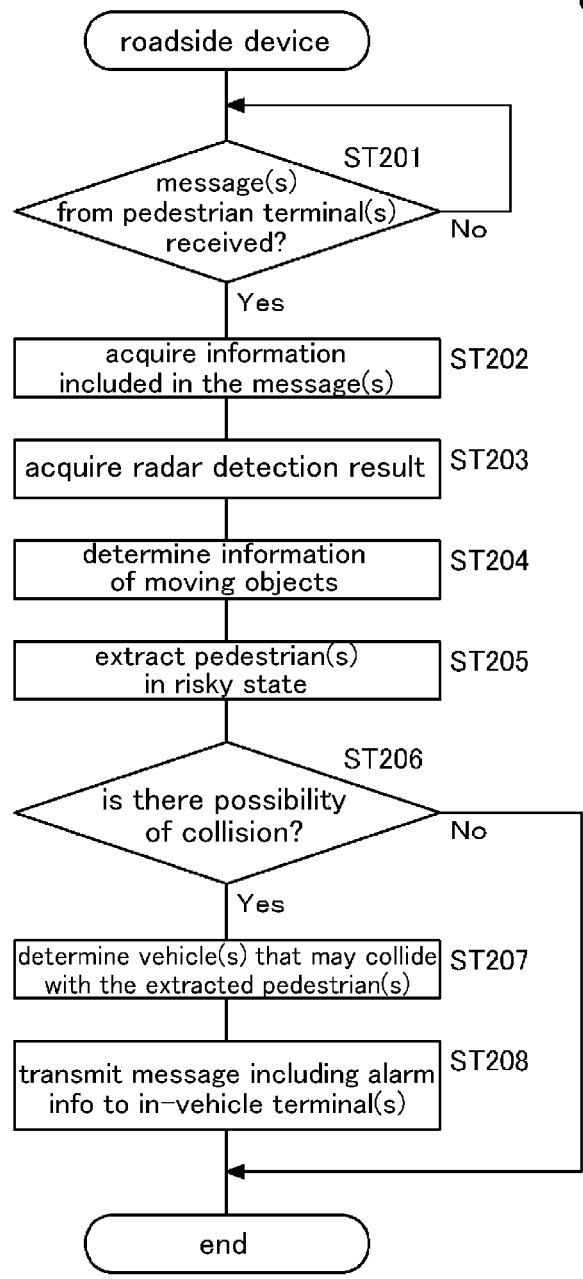
FIG. 8 is a flowchart showing an operation procedure of the roadside device 5 according to the first embodiment.

Next, an operation procedure of the roadside device 5 according to the first embodiment will be described. FIG. 8 is a flowchart showing the operation procedure of the roadside device 5. In FIG. 8, the roadside device 5 detects the positions of the vehicles with a radar or acquires the positions of the vehicles with a message received from the in-vehicle terminal 3.

In the roadside device 5, first, when a message(s) transmitted from the pedestrian terminal(s) 1 are received by the ITS communication device 52 (Yes in ST201), the pedestrian information (position information, state information, and the like) included in each received message is acquired (ST202). Further, the detection result of the radar 51 is acquired (ST203).

Next, based on the message(s) received from the pedestrian terminal(s) 1, the detection result of the radar 51, and the map information in the storage 54, the moving object determiner 62 determines the information (position information and state information) of each moving object present on the roads around the own roadside device (ST204).

Subsequently, the collision determiner 63 extracts a pedestrian(s) in a risky state based on the state information included in each message received from the pedestrian terminal(s) 1 (ST205). Then, it is determined whether there is a possibility that some pedestrian in a risky state may collide with some vehicle (ST206).

Here, in a case where there is a possibility that some pedestrian in a risky state may collide with some vehicle (Yes in ST206), the vehicle(s) with which each such pedestrian may collide is/are determined (ST207). Then, a message including alarm information indicating that the pedestrian(s) in a risky state may collide with the vehicle(s) is generated, and the message is transmitted, with the terminal ID(s) of the in-vehicle terminal(s) 3 of the vehicle(s) that may collide with the pedestrian(s) being included in the message (ST208). By including the terminal ID(s) of the in-vehicle terminal(s) 3 in the message, the in-vehicle terminal(s) 3 having the terminal ID(s) can be designated as a receiving destination(s).

On the other hand, in a case where there is no possibility that some pedestrian in a risky state may collide with some vehicle (No in ST206), the process terminates without performing further processing.

Figure 9:
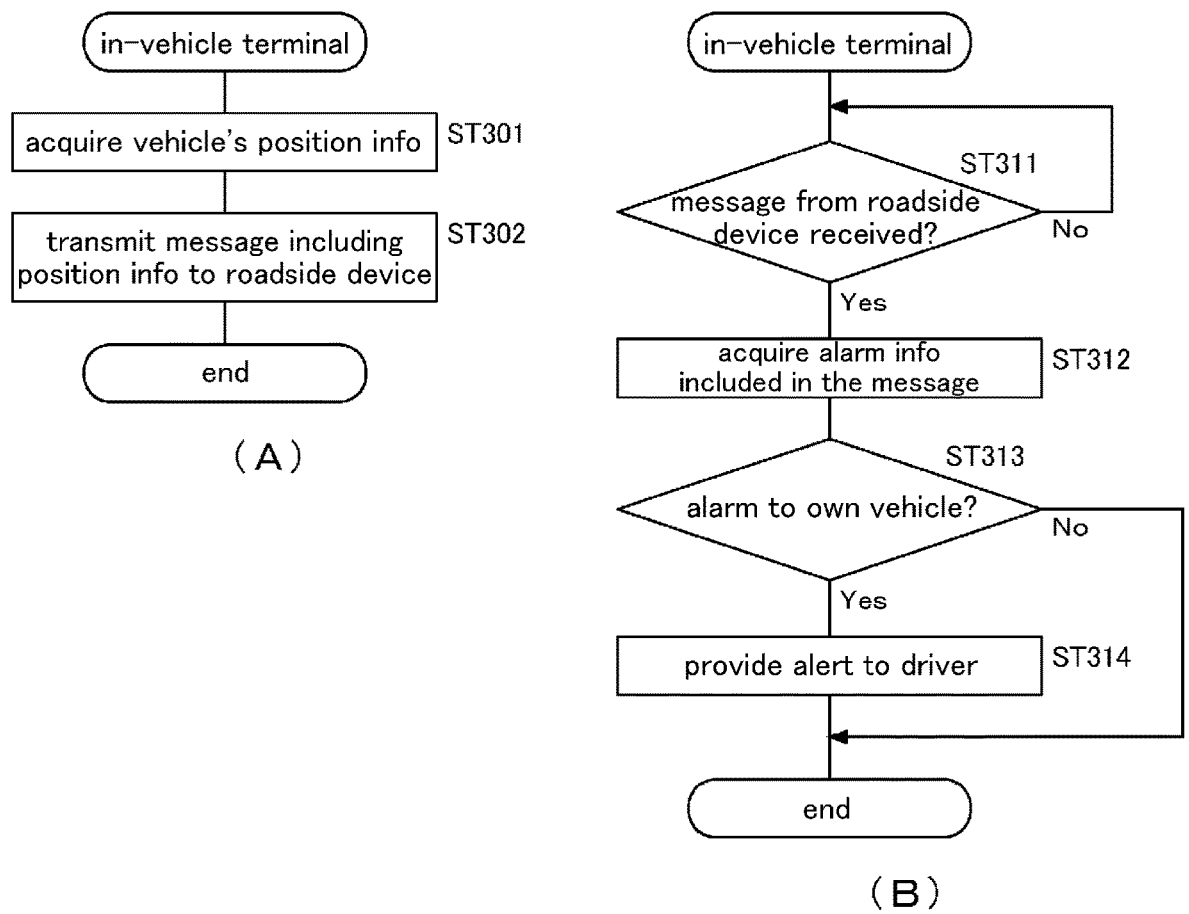
FIG. 9 is a flowchart showing an operation procedure of the in-vehicle terminal 3 according to the first embodiment.

Next, an operation procedure of the in-vehicle terminal 3 according to the first embodiment will be described. FIG. 9 is a flowchart illustrating the operation procedure of the in-vehicle terminal 3.

As shown in (A) of FIG. 9, in the in-vehicle terminal 3, the positioning system 31 acquires the position information of the own vehicle (ST301). Then, the message controller 41 generates a message including the vehicle information (position information of the own vehicle, etc.) and transmits the message from the ITS communication device 32 (ST302). Note that this message may be transmitted to the pedestrian terminals 1 by ITS communication (pedestrian-to-vehicle communication) as well as to other in-vehicle terminals 3 by ITS communication (vehicle-to-vehicle communication), and the terminals receiving the message may respectively perform the collision determination based on the position information included in the message and the position information of the own terminal.

Further, as shown in (B) of FIG. 9, in the in-vehicle terminal 3, when the ITS communication device 32 receives a message transmitted from the roadside device 5 (Yes in ST311), the alert controller 43 acquires the alarm information included in the received message (ST312). Then, based on the vehicle ID(s) included in the alarm information, it is determined whether or not the alarm is addressed to the own vehicle (ST313). Here, if the alarm is addressed to the own vehicle (Yes in ST313), a process of alerting the driver of the own vehicle is performed (ST314).

On the other hand, if the alarm is not addressed to the own vehicle (No in ST313), the process terminates without performing further processing.

Second Embodiment

Next, a second embodiment will be described. Except for what will be discussed here, this embodiment is the same as the above-described embodiment. FIG. 10 is an explanatory diagram illustrating an outline of control performed by the roadside device 5 according to the second embodiment.

In the roadside device 5, a vehicle equipped with the in-vehicle terminal 3 having an ITS communication function can be detected based on a message sent from the in-vehicle terminal 3, but a vehicle not equipped with the in-vehicle terminal 3 cannot be detected based on the message from the in-vehicle terminal 3. On the other hand, the radar 51 is capable of only short-distance detection (for example, several tens of meters) for pedestrians, but is capable of long-distance detection (for example, several hundreds of meters) for vehicles. Further, in the radar 51, the maximum detection distance can be extended by narrowing the scan range, which enables long-distance detection though the detection angle becomes small.

Therefore, in the present embodiment, when a pedestrian in a risky state is detected by the roadside device 5 based on a message from some pedestrian terminal 1, vehicles around the pedestrian are detected by controlling the detection area of the radar 51 to be around the pedestrian such that the vehicles present around the pedestrian can be detected quickly. Thereby, even though the pedestrian in a risky state located at a long distance cannot be detected by the radar 51, vehicles present around such pedestrian can be detected by the radar 51, including those not equipped with the in-vehicle terminals 3. Thus, the position information of the vehicles present around the pedestrian in a risky state can be acquired without fail.

In a normal mode, as shown in (A) of FIG. 10, the radar 51 is controlled such that a large detection angle is achieved. In this case, the detection distance becomes short. On the other hand, in a case where a pedestrian in a risky state is found and the pedestrian is out of the detection area in the normal mode, the radar 51 is switched to a long-distance mode as shown in (B) of FIG. 10. In this long-distance mode, the detection angle is reduced to increase the detection distance, and the detection direction is set such that a predetermined area around the pedestrian in a risky state is contained in the detection area.

Figure 11:
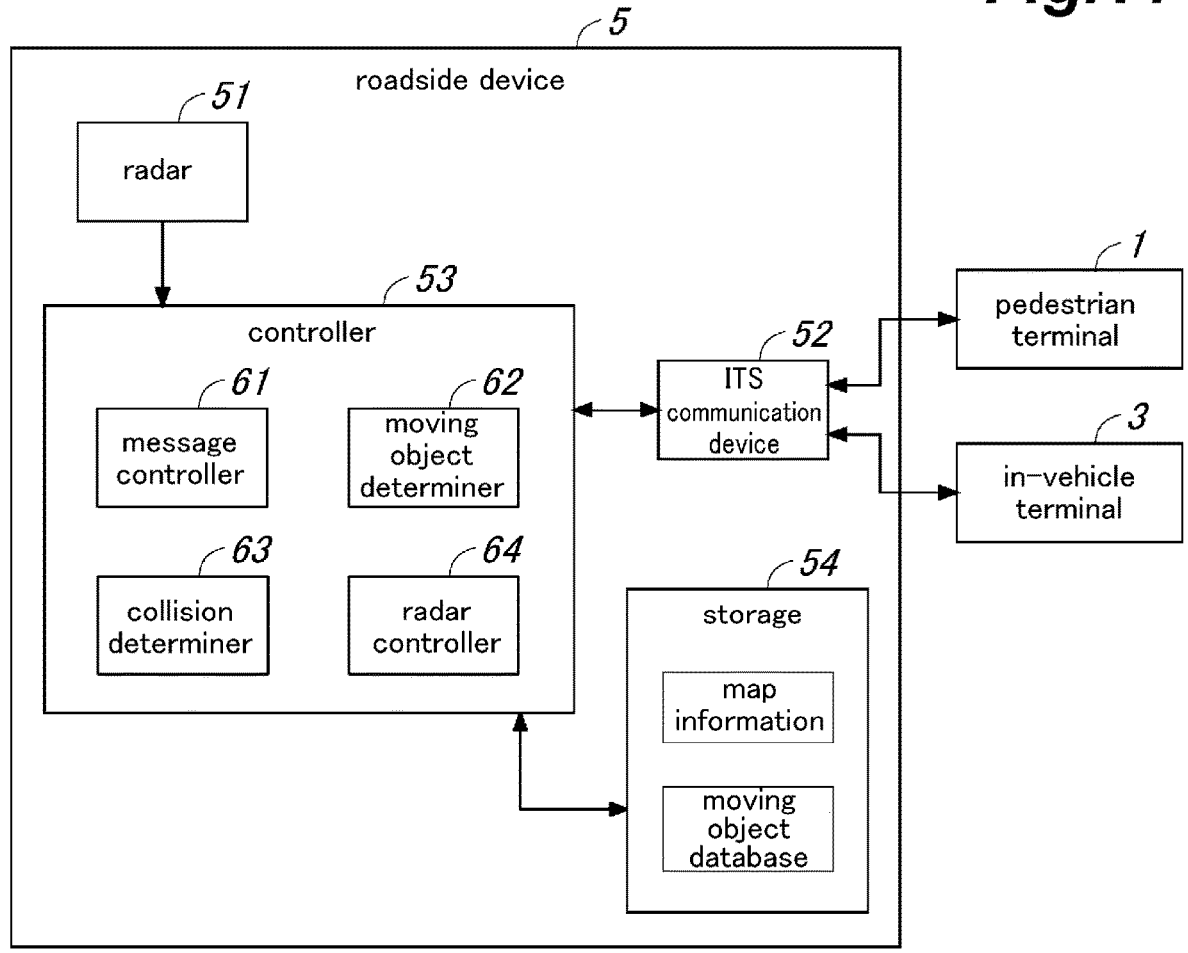
FIG. 11 is a block diagram showing a schematic configuration of the roadside device 5 according to the second embodiment.

Next, a schematic configuration of the roadside device 5 according to the second embodiment will be described. FIG. 11 is a block diagram showing the schematic configuration of the roadside device 5. The configuration of the pedestrian terminal 1 is the same as that of the first embodiment (see FIG. 3), and the configuration of the in-vehicle terminal 3 is also the same as that of the first embodiment (see FIG. 4).

The configuration of the roadside unit 5 is approximately the same as that of the first embodiment (see FIG. 5), but the controller 53 includes a radar controller 64. When the radar controller 64 detects a pedestrian in a risky state based on the state information included in a message transmitted from the pedestrian terminal 1, the radar controller 64 controls the detection area of the radar 51 based on the pedestrian's position information included in the message so that the area around the pedestrian is included in the detection area.

Third Embodiment

Figure 12:
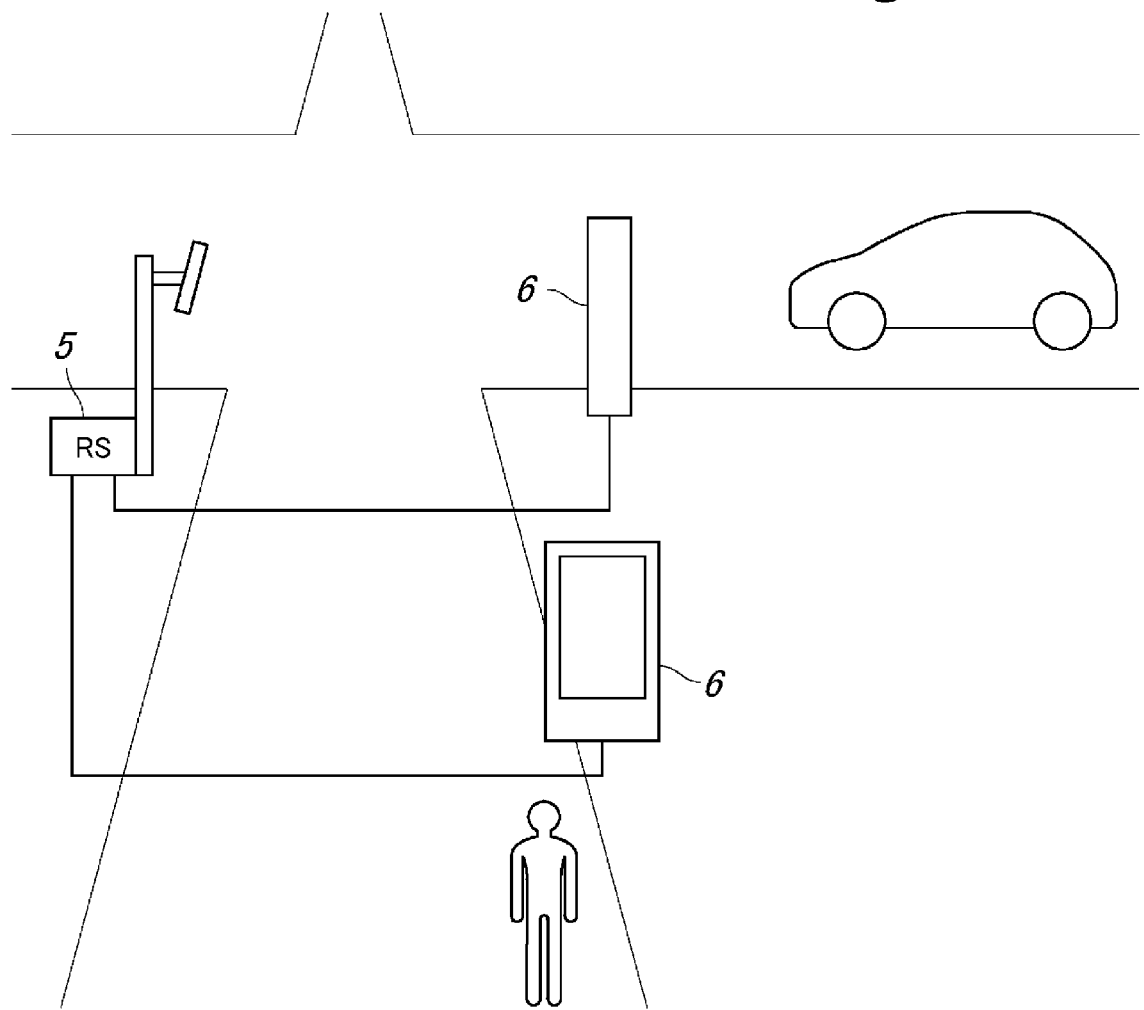
FIG. 12 is an explanatory diagram illustrating an outline of a communication system according to a third embodiment.

Next, a third embodiment will be described. Except for what will be discussed here, this embodiment is the same as the above-described embodiment. FIG. 12 is an explanatory diagram illustrating an outline of a communication system according to the third embodiment.

In a case where a pedestrian does not carry the pedestrian terminal 1 or in a case where a vehicle is not equipped with the in-vehicle terminal 3 having an ITS communication function, it is not possible to notify the passenger or the driver of the vehicle that there is a risk of collision by means of a message. Therefore, in the present embodiment, an alarm device 6 is disposed on or near a road, and the roadside device 5 controls the alarm device 6 to notify the pedestrians not carrying the pedestrian terminals 1 and the drivers of the vehicles not equipped with the in-vehicle terminals 3 that there is a risk of collision.

The alarm device 6 is installed in a place where accidents are likely to occur, such as an intersection. In particular, from the viewpoint of preventing crossing collisions, it is preferable to install the alarm device 6 at a blind intersection. The alarm device 6 may be composed of a display that displays a screen indicating that there is a risk of collision, a lamp that lights up to notify that there is a risk of collision, or the like.

Figure 13:
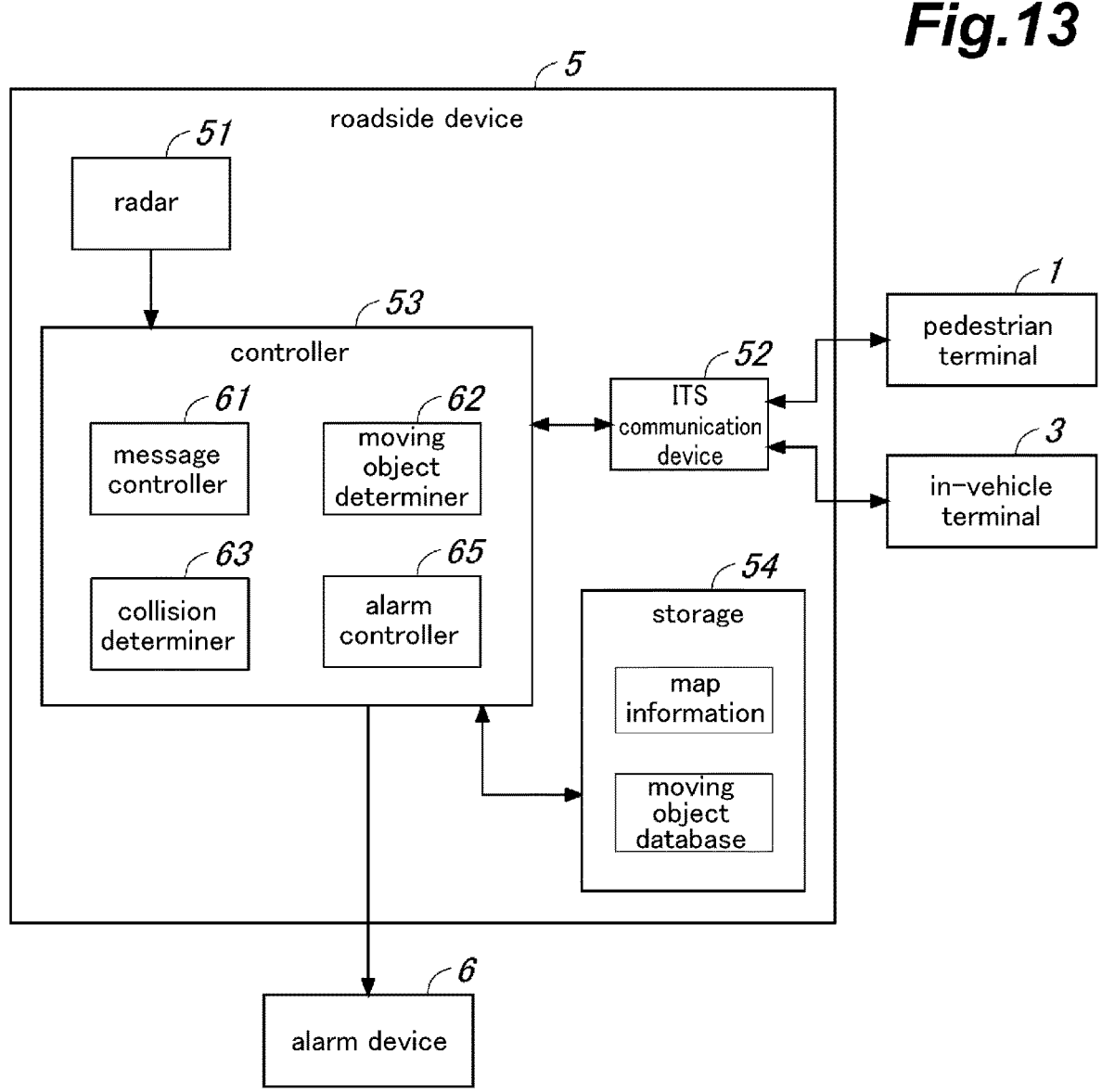
FIG. 13 is a block diagram showing a schematic configuration of a roadside device 5 according to the third embodiment.

Next, a schematic configuration of the roadside device 5 according to the third embodiment will be described. FIG. 13 is a block diagram showing the schematic configuration of the roadside device 5. The configuration of the pedestrian terminal 1 is the same as that of the first embodiment (see FIG. 3), and the configuration of the in-vehicle terminal 3 is also the same as that of the first embodiment (see FIG. 4).

The configuration of the roadside unit 5 is approximately the same as that of the first embodiment (see FIG. 5), but the controller 53 includes an alarm controller 65. The alarm controller 65 controls the alarm device 6, and when the collision determiner 63 determines that there is a risk that some vehicle may collide with some pedestrian in a risky state, the alarm controller 65 causes the alarm device 6 to perform an alarm operation (display of a display screen, lighting of a lamp, and the like) to notify the pedestrians and the drivers of the vehicles that there is a risk of collision. Note that the collision determiner 63 may determine the risk of collision between vehicles as well as the risk of collision between pedestrians and vehicles irrespective of whether or not a risky action is taken by any pedestrian and cause the alarm device 6 to perform the alarm operation to notify the risk to the pedestrians and the drivers of the vehicles.

Fourth Embodiment

Figure 14:
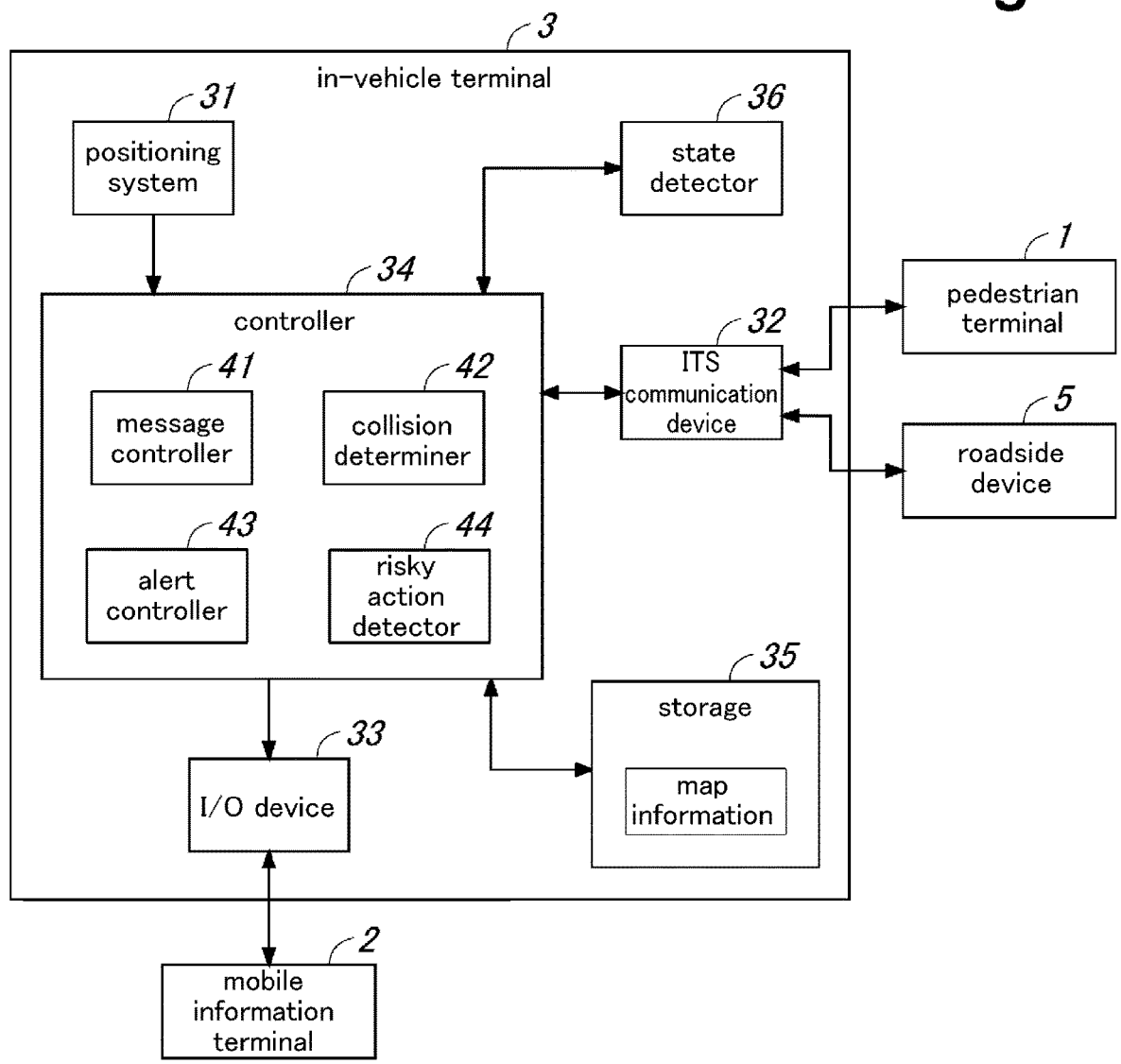
FIG. 14 is a block diagram showing a schematic configuration of an in-vehicle terminal 3 according to a fourth embodiment.

Next, a fourth embodiment will be described. Except for what will be discussed here, this embodiment is the same as the above-described embodiment. FIG. 14 is a block diagram showing a schematic configuration of an in-vehicle terminal 3 according to the fourth embodiment. The configuration of the pedestrian terminal 1 is the same as that of the first embodiment (see FIG. 3), and the configuration of the roadside device 5 is also the same as that of the first embodiment (see FIG. 5).

The configuration of the in-vehicle terminal 3 is approximately the same as that of the first embodiment (see FIG. 4), but includes a state detector 36. The state detector 36 detects a state (acceleration, three-axis angle, etc.) of the vehicle. The state detector 36 is constituted of an inertial measurement unit (IMU), for example, and has all or part of the functions of an acceleration sensor, a geomagnetic sensor, and a gyro sensor.

The controller 34 further includes a risky action detector 44. The risky action detector 44 acquires road information (information on the centerline and width of each road) around the own vehicle from the map information in the storage 35, and based on the road information, the own vehicle's position information obtained by the positioning system 31, and the detection result of the state detector 36, detects that the own vehicle is taking a risky action (sudden acceleration, meandering, sudden turn (sudden change of direction), etc.).

When the risky action detector 44 detects that the own vehicle is taking a risky action (such as sudden acceleration or meandering), the message controller 41 transmits a message including state information indicating that the own vehicle is taking a risky action from the ITS communication device 32.

The alert controller 43 alerts the driver of the own vehicle when the risky action detector 44 detects that the own vehicle is taking a risky action (such as sudden acceleration or meandering).

In the roadside device 5, when the message including the state information is received by the ITS communication device 52 from the in-vehicle terminal 3, the collision determiner 63 performs a collision determination, and if it is determined that there is a risk that the vehicle may collide with a pedestrian or another vehicle, transmits a message including alarm information from the ITS communication device 52 to the pedestrian terminal 1 or the in-vehicle terminal 3 that may be involved in the collision.

Next, the messages transmitted from the in-vehicle terminal 3 and the roadside device 5 according to the fourth embodiment will be described. FIG. 15 is an explanatory view showing contents of the messages transmitted from the in-vehicle terminal 3 and the roadside device 5.

In the present embodiment, when the in-vehicle terminal 3 detects that the own vehicle is taking a risky action (such as sudden acceleration or meandering), the in-vehicle terminal 3 generates a message including the position information of the own vehicle and the state information indicating that the own vehicle is taking a risky action and transmits the message by ITS communication.

At this time, as shown in (A) of FIG. 15, the message transmitted from the in-vehicle terminal 3 is generated according to the message format for ITS communication similarly to the first embodiment (see FIG. 6), and the prescribed information such as time, position, and terminal ID is stored in the common area while the state information is stored in the free area.

In the present embodiment, the following information is stored in the free area as the state information: header information (information storage flag) indicating whether or not state information related to a risky action is stored; information indicating whether or not the vehicle is making sudden acceleration (sudden acceleration flag); information indicating whether or not the vehicle is meandering (meandering flag); and information on the traveling direction.

Note that the bit configuration of the message is not particularly limited. Further, in the example shown in (A) of FIG. 15, two flags respectively related to sudden acceleration and meandering as risky actions are set, but three or more flags may be set by increasing the types of risky actions. Also, in the example shown in (A) of FIG. 15, the types of risky actions (sudden acceleration and meandering) are distinguished and notified, but it is also possible to store information indicating whether a risky action is taken in the free area without distinguishing between the types.

Further, in the present embodiment, when the roadside device 5 determines that there is a risk that a vehicle(s) may collide with some pedestrian, the roadside device 5 generates a message including alarm information indicating the presence of risk that the vehicle(s) may collide with the pedestrian and transmits the message by ITS communication such that the message is addressed to the pedestrian terminal 1 of the pedestrian having the risk of collision.

At this time, as shown in (B) of FIG. 15, the message transmitted from the roadside device 5 is generated according to the message format for ITS communication similarly to the message shown in (A) of FIG. 15, and the prescribed information such as time and terminal ID is stored in the common area while the alarm information is stored in the free area.

In the present embodiment, the pedestrian ID of the pedestrian having a risk of collision (terminal ID of the pedestrian terminal 1) and vehicle lists regarding the vehicle(s) that may collide with the pedestrian are stored in the free area as the alarm information. When there are multiple pedestrians having a risk of collision, the pedestrian ID and the vehicle lists are stored in the free area for each such pedestrian.

The vehicle lists are stored for the respective types of risky actions (sudden acceleration and meandering). The vehicle list of the vehicle(s) making sudden acceleration is configured to store the position information of the vehicle(s) that is/are making sudden acceleration and may collide with the pedestrian. The vehicle list of the meandering vehicle(s) is configured to store the position information of the vehicle(s) that is/are meandering and may collide with the pedestrian.

When the pedestrian terminal 1 receives a message including the alarm information from the roadside device 5, the pedestrian terminal 1 alerts the pedestrian if the own pedestrian ID is included in the alarm information of the message. Further, based on the vehicle lists associated with the own pedestrian ID, the pedestrian terminal 1 extracts the vehicle(s) that may collide with the pedestrian and presents the position(s) of the extracted vehicle(s) to the pedestrian.

For example, the pedestrian terminal 1 causes an icon(s) representing the vehicle(s) that may collide with the pedestrian to be displayed on the screen of the mobile information terminal 2.

Note that the bit configuration of the message is not particularly limited. Further, in the example shown in (B) of FIG. 15, two vehicle lists respectively related to sudden acceleration and meandering as risky actions are stored, but three or more vehicle lists may be stored by increasing the types of risky actions. Also, in the example shown in (B) of FIG. 15, the vehicle lists are stored separately for the respective types of risky actions (sudden acceleration and meandering), but one vehicle list may be stored without distinguishing between the types of risky actions. It is also possible to store one vehicle list in which the pieces of position information are associated with the types of risky actions.

In the example shown in (B) of FIG. 15, the position information of each vehicle is stored in the vehicle list, but the vehicle ID (the terminal ID of the in-vehicle terminal 3) may be additionally stored.

As described above, the embodiments have been described as examples of the technology disclosed in the present application. However, the technology of the present disclosure is not limited thereto and may also be applied to embodiments in which changes, substitutions, additions, omissions, etc. may be made. In addition, it is also possible to combine the constituent elements described in the above embodiments to yield a new embodiment.

For example, in the above embodiments, objects (including moving objects such as pedestrians and vehicles) on roads are detected by a radar (millimeter wave radar, laser radar) to acquire position information of the objects, but the object detector for detecting objects on roads is not limited to a radar, and may be a stereo camera, for example, and it is possible to detect objects on roads from the images captured by the stereo camera.

Further, in the above embodiments, the terminal carried by a pedestrian walking on the road was regarded as a pedestrian terminal, and the terminal mounted on a vehicle was regarded as an in-vehicle terminal. However, as for vehicles such as mobility scooters and two-wheeled vehicles (such as motorcycles and bicycles), the terminal carried by a person riding the vehicle may be regarded as a pedestrian terminal or an in-vehicle terminal.

INDUSTRIAL APPLICABILITY

The roadside device, the communication system, and the risk detection method according to the present invention have an effect that a risk of collision between moving objects can be quickly and accurately determined in the roadside device, and are useful as a roadside device disposed on or near a road, a communication system including a terminal device configured to be carried by a moving object and a roadside device, and a risk detection method for detecting, in a roadside device disposed on or near a road, a risk of collision between moving objects present around the roadside device.

Glossary

1 pedestrian terminal (terminal device)
3 in-vehicle terminal (terminal device)
5 roadside device (roadside device)
6 alarm device
11 positioning system
12 state detector
13 ITS communication device
14 I/O device
15 controller
16 storage
31 positioning system
32 ITS communication device
33 I/O device
34 controller
35 storage
36 state detector
51 radar (object detector)
52 ITS communication device
53 controller
54 storage

The invention claimed is:

1. A roadside device disposed on or near a road, comprising:
   an object detector configured to detect moving objects on roads;
   a communication device configured to communicate with a terminal device carried by a moving object; and
   a controller that, when a message including state information indicating that the moving object is in a risky state is received by the communication device from the terminal device, acquires position information of another moving object present around the moving object in the risky state based on a detection result of the object detector, and determines a risk of collision between the moving objects based on the position information of the other moving object,
   wherein the controller is configured to control a detection area of the object detector based on position information of the terminal device included in the message received by the communication device such that a predetermined area around the moving object in the risky state is contained in the detection area.

2. The roadside device according to claim 1, wherein when the risk of collision exists, the controller transmits a message including alarm information indicating that the risk of collision exists from the communication device to the terminal device.

3. The roadside device according to claim 1, wherein when the risk of collision exists, the controller controls an alarm device disposed on or near a road to notify that the risk of collision exists.

4. The roadside device according to claim 1, wherein the controller is configured to determine position information of the moving object based on position information of the moving object included in the message received by the communication device and position information of the moving object obtained from the detection result of the object detector.

5. The roadside device according to claim 1 wherein the controller is configured to change a detection angle of the object detector depending on a distance between the terminal device and the roadside device.

6. A communication system including a terminal device configured to be carded by a moving object and a roadside device disposed on or near a road,
   wherein the terminal device comprises;
   a state detector configured to detect a state of the moving object;
   a first communication device configured to perform Intelligent Transport System (ITS) communication; and
   a first controller that, when detecting a risky action of the moving object based on a detection result of the state detector, transmits a message including state information indicating that the moving object is in a risky state from the first communication device, wherein the roadside device comprises:

an object detector configured to detect moving objects on roads;

a second communication device configured to perform Intelligent Transport System (ITS) communication; and a second controller that, when the message including the state information is received by the second communication device from the terminal device, acquires position information of another moving object present around the moving object in the risky state based on a detection result of the object detector, and determines a risk of collision between the moving objects based on the position information of the other moving object, and wherein the second controller is configured to control a detection area of the object detector based on position information of the terminal device included in the message received by the second communication device such that a predetermined area around the moving object in the risky state is contained in the detection area.

7. A risk detection method for detecting, in a roadside device disposed on or near a road, a risk of collision between moving objects present around the roadside device, the method comprising:

when a message including state information indicating that a moving object is in a risky state is received from a terminal device carried by the moving object, acquiring position information of another moving object present around the moving object in the risky state based on a result of detecting moving objects on roads by object detection;

determining a risk of collision between the moving objects based on the position information of the other moving object; and controlling a detection area of the object detection based on position information of the terminal device included in the message received from the terminal device such that a predetermined area around the moving object in the risky state is contained in the detection area.

* * * * *